United States Patent [19]

Langford et al.

[11] Patent Number: 5,206,929
[45] Date of Patent: Apr. 27, 1993

[54] OFFLINE EDITING SYSTEM

[75] Inventors: Ted E. Langford, Fremont; David Wheeler, Palo Alto, both of Calif.

[73] Assignee: Sony Corporation of America, Park Ridge, N.J.

[21] Appl. No.: 604,890

[22] Filed: Oct. 26, 1990

Related U.S. Application Data

[63] Continuation-in-part of Ser. No. 467,160, Jan. 19, 1990.

[51] Int. Cl.$^5$ ............... G06F 9/00; G06F 15/62; H04N 5/76
[52] U.S. Cl. ................... 395/159; 358/311; 358/903; 395/161; 395/157
[58] Field of Search ........... 358/311, 903, 342; 360/14.1; 395/159, 161, 118, 155, 156

[56] References Cited

U.S. PATENT DOCUMENTS

| | | |
|---|---|---|
| 3,721,757 | 3/1973 | Ettlinger. |
| 4,100,607 | 7/1978 | Skinner. |
| 4,272,790 | 6/1981 | Bates. |
| 4,449,198 | 5/1984 | Kroon et al.. |
| 4,521,870 | 6/1985 | Babbel et al.. |
| 4,538,188 | 8/1985 | Barker et al.. |
| 4,591,931 | 5/1986 | Baumeister. |
| 4,600,989 | 7/1986 | Schwartz et al.. |
| 4,612,569 | 9/1986 | Ichinose. |
| 4,660,101 | 5/1987 | Martin. |
| 4,675,755 | 6/1987 | Baumeister et al.. |
| 4,685,001 | 8/1987 | Martin. |
| 4,685,003 | 8/1987 | Westland. |
| 4,709,277 | 11/1987 | Ninomiya et al.. |
| 4,717,971 | 1/1988 | Sawyer. |
| 4,746,994 | 5/1988 | Ettlinger. |
| 4,754,342 | 6/1988 | Duffy. |
| 4,855,842 | 8/1989 | Hayes et al.. |
| 4,868,687 | 9/1989 | Penn et al.. |
| 5,021,976 | 6/1991 | Wexelblat et al. ............ 395/159 |

FOREIGN PATENT DOCUMENTS

| | | |
|---|---|---|
| 0240794A2 | 10/1987 | European Pat. Off.. |
| 0268270A3 | 5/1988 | European Pat. Off.. |
| 0338753 | 10/1989 | European Pat. Off.. |

OTHER PUBLICATIONS

Conversation with Larry Seehorn, "The Midas Touch", Videography journal, May 1989, pp. 78–80.
Seehorn Technologies Inc., "MIDAS I", one-page brochure, undated.

(List continued on next page.)

*Primary Examiner*—Robert L. Richardson
*Attorney, Agent, or Firm*—Limbach & Limbach

[57] ABSTRACT

A post production offline editing system including a processor programmed to display an initial menu prompting a user to select a multiple camera editing mode (in which the user selects edits while simultaneously viewing scenes from two or more sources), a single camera editing mode, a display edit information mode, or a scene take management mode. Preferably in the single camera edit mode, the user may select a splice (or transition) between two edits by selecting a sequence of items from sequentially displayed transition menus. For example, a first pulldown transition menu prompts the user to select a general transition type such as a "dissolve" or "wipe," and a second pulldown transition menu then prompts the user to select one of several versions of the selected general transition type. In the multiple camera editing mode, the user may select either a set-up mode or an execute mode. In the edit list management mode, the user may select a variety of modes, including a rehearse mode, a list management mode, and a reformat mode. In the display edit information mode, the invention preferably displays a partial edit list and a highlight icon, respectively, in first and second areas of a monitor screen. When a user selects a region of the highlight icon corresponding to a selected edit, the system highlights the selected edit from the displayed list and displays information about the selected edit in a third area of the monitor screen.

25 Claims, 16 Drawing Sheets

OTHER PUBLICATIONS

Seehorn Technologies Inc., "MIDAS II", nine-page brochure, Oct. 1989.

"CMX 6000 Random-Access Editing System", five-page brochure, Mar. 1987.

"EditDroid—The Editing System of Choice", six-page brochure, 1985.

"E-Pix Hybrid Editing System", four-page brochure, undated.

David Hughes, "EMC$^2$:The New Editing Equation at Henninger Video", Videography Journal, p. 68.

"The Link Editing System", seven-page brochure, Oct. 1988.

"Avid/1 Media Composer—Product Description", two-page brochure, Apr. 1989.

"Montage Picture Processor—Product Specifications", four-page brochure, undated.

Pinnacle Systems, Inc., four-page brochure, undated.

Tom Mann, "Non-linear Off-Line Editing for HDTV and Film", Image Technology, Dec. 1989, pp. 541-546.

Jeffrey Borish, et al., "SoundDroid: A New Approach to Digital Editing and Mixing of Sound", The BKSTS Journal, Jul. 1985, pp. 412-417.

OFF-LINE WORK STATION
AUDIO CONNECTION DIAGRAM

OFFLINE EDITING SYSTEM

CROSS-REFERENCE TO RELATED APPLICATION

This application is a continuation-in-part of copending U.S. patent application Ser. No. 07/467,160, filed Jan. 19, 1990.

FIELD OF THE INVENTION

The invention is a post production editing system which includes means for storing unedited video takes in a random access memory, displaying selected takes (or individual frames from selected takes), and generating an edit list which defines an edited video program. In a preferred embodiment, the unedited video takes are stored in one or more laser video disks, and the invention includes a computer programmed to display menus prompting a user to perform desired editing operations.

BACKGROUND OF THE INVENTION

Post production editing of film and video works may be efficiently accomplished using offline and online editing systems. Offline editing systems generate an edit list by manipulating unedited takes that have been stored in video tape or laser video disk format (i.e., motion picture film takes that have been transferred to video tape or video disk), and stored addresses (time codes) identifying the first and last frame of each take. The edit list specifies a sequence of selected takes (with transitions between the takes), which may subsequently be used by an online editing system to generate an edited master film (or tape) from the originally produced medium (i.e., motion picture film).

Post production offline editing systems have been proposed which include means for storing unedited video takes and addresses (on video tape or laser video disks), and computer means for controlling the display of selected unedited video takes (or frames of such takes) and generating the edit list in response to user-entered commands.

Throughout this specification, the noun "edit" shall be used (with reference to video signals) to denote one or more consecutive video frames which correspond to all or part of a scene or take. With reference to audio signals, the noun "edit" shall be used to denote a left or right channel of an audio soundtrack which corresponds to a video edit. The nouns "splice" and "transition" shall be used interchangeably to denote a transition between two edits, and the noun "show" (or "video program" or "audio program") shall be used to denote a sequence of edits and splices.

A "splice" may be a simple cut, in which the end (i.e., the last frame) of a first edit is concatenated with the beginning (i.e., first frame) of a second edit. Alternatively, a splice (whether video or audio) may be a more complicated transition, such as a wipe, fade, or dissolve. For example, a show may consist of a first edit, followed by a simple cut to a second edit, followed by a dissolve splice to a third edit. Typically, a show will include a video portion, as well as left and right channels of an audio soundtrack.

Sometimes in the specification, the terms "left" and "right" edits will be used respectively to denote earlier and later edits. Used in this sense, for example, when a viewer views a show in its normal time sequence (i.e., not in a reversed sequence), the viewer will see the left edit before the right edit.

Several systems have been proposed for post production offline editing. For example, U.S. Pat. No. 4,796,994 (issued May 24, 1988, to Ettlinger) discloses a computer-based video editing system in which unedited takes are stored on video tape recorders (although the reference also includes a very general suggestion that video disk players may be substituted for the video tape recorders). A computer system enables the user to control the video tape recorders and generate an edit list. The computer system displays a sequence of menus which prompt the user to perform various editing operations (such as displaying desired frames of the unedited takes, shuttling frame-by-frame through a stored unedited take, adding edits to an edit list, and playing back the sequence of takes defined by the edit list). The user may select various ones of the editing operations by actuating a light pen.

For another example, U.S. Pat. No. 4,754,352 (issued Jun. 28, 1988, to Duffy) discloses a computer-based video editing system in which unedited takes are stored on video disk players. After generating an edit list, the user may command the system to electronically splice takes in accordance with the edit list and play back the edited show. By using a control console 50 with a control buttons 100 through 112 and a dial 114, the user may command the system to display individual frames of the stored takes, or "roll" one or more takes (or an edited sequence of takes) in forward or reverse motion, at any of a variety of speeds.

However, use of light pens (as in U.S. Pat. No. 4,796,994) is cumbersome and distracts the user's attention from the editing operation, and use of dials and buttons as disclosed in U.S. Pat. No. 4,754,352 is also cumbersome as the dials and buttons perform only a limited number of functions, necessitating use of a computer keyboard to perform other essential post production editing functions. Furthermore, until the present invention, it had not been known how to provide global access to a variety of video post production environments (i.e., computer menus for scene logging, edit list modification, replay of an edited show, and the like) at any point during an post production offline editing operation, and it had not been known how to design user interface software to accomplish this function using convenient icons which may be selected by the user using a mouse-type input device.

SUMMARY OF THE INVENTION

The invention is a post production offline editing system including a processor programmed to display an initial menu prompting a user to select any of a "multiple camera" editing mode (in which the user selects edits while simultaneously viewing scenes from two or more sources); a "single camera" editing mode; a "display edit information" mode; and an edit list management mode.

In one preferred embodiment, the invention includes a video special effects unit capable of processing stored edits to simulate various video splices (such as dissolves, fades, and wipes) to enable a user to view a show defined by an edit list which specifies such splices. Preferably in the single camera edit mode, the user may select a splice between two edits by selecting a sequence of items from sequentially displayed transition menus. For example, a first pulldown transition menu may prompt the user to select a general transition type such as a "dissolve" or "wipe," and a second pulldown transition menu may then prompt the user to select one of several versions of the selected general transition type.

In the multiple camera editing mode, the user may select either a "set-up" mode or an "execute" mode. In the edit list management mode, the user may select a variety of modes, including a rehearse mode, a list management mode, and a reformat mode.

In a preferred embodiment of the "display edit information" mode, the invention conveniently displays information regarding any selected edit by displaying a partial edit list in a first area of a monitor screen and displaying a "highlight icon" in a second area of the monitor screen. When a user selects a region of the highlight icon corresponding to the selected edit, the system highlights the selected edit from the displayed list and displays information about the selected edit in a third area of the monitor screen.

The invention preferably also includes a means for storing unedited video takes in a random access memory (preferably a set of laser video disk players), displaying selected takes (or individual frames from selected takes), and generating an edit list which defines an edited video program. Also, the invention preferably includes a computer programmed with software providing an integrated software environment which enables a user conveniently to log unedited takes into the system, and to generate an edit list suitable for use in a subsequent online editing operation. The system software preferably provides global access to a variety of video post production environments (i.e., computer menus prompting the user to perform a variety of operations, such as logging of unedited takes onto the system, edit list modification, and playback of an edited show) at any point during an offline editing operation.

The system's user interface preferably includes a convenient means for jogging (and shuttling) the laser disk players using a mouse or trackball. After selecting a special jog/shuttle window (identified by an icon or mnemonic text), the user actuates certain buttons on the mouse to enter a mode in which rightward motion of the mouse commands the appropriate video disk player to shuttle a disk player in a forward direction, and leftward motion of the mouse commands the video disk player to shuttle in the reverse direction.

DETAILED DESCRIPTION OF THE PREFERRED EMBODIMENT

Figure 1:
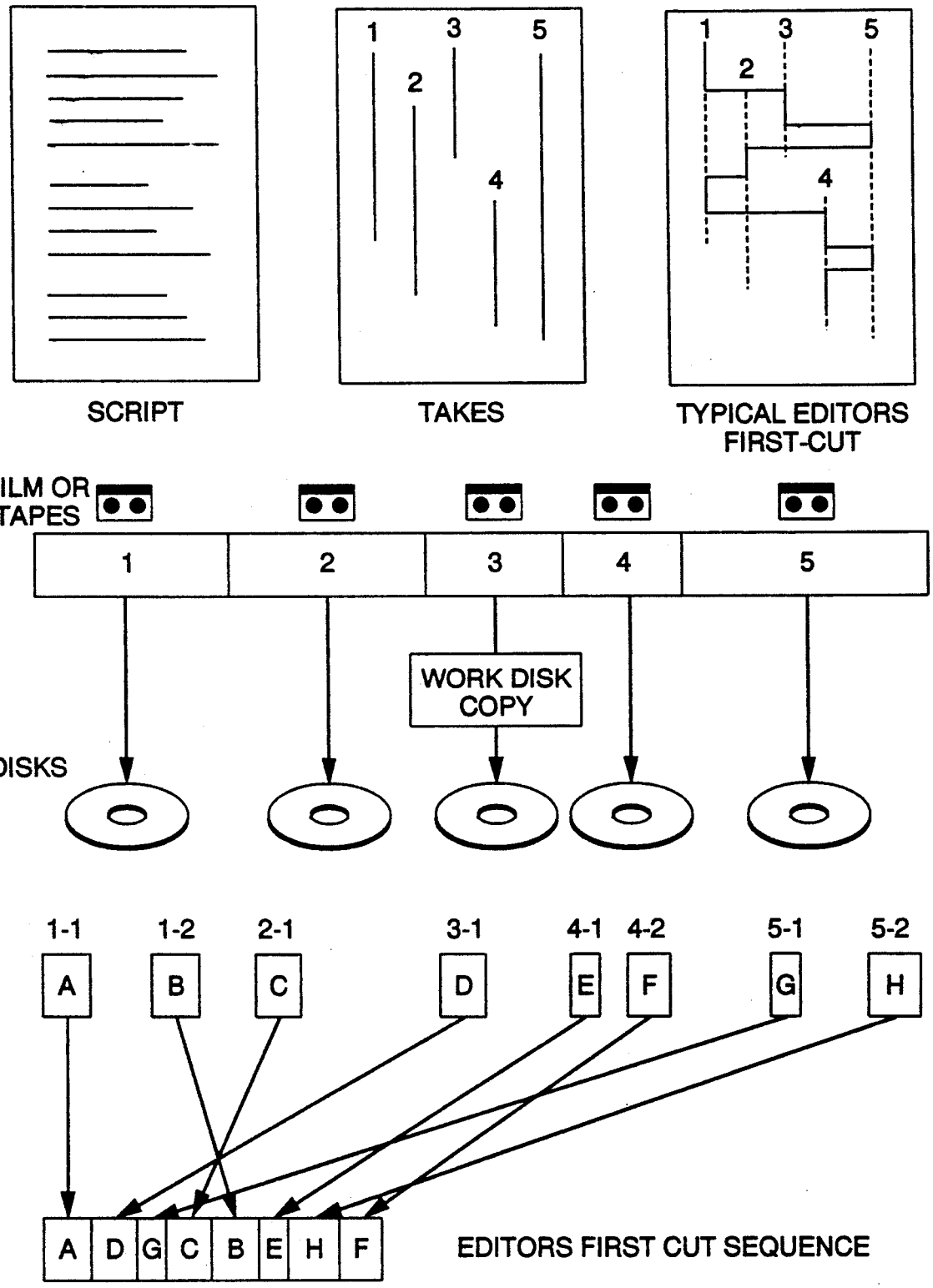
FIG. 1 is a schematic diagram representing the steps performed during post production offline editing.

FIG. 1 is a schematic diagram representing the steps performed during post production offline editing. FIG. 1 contemplates that during production, the production crew has prepared five video tapes (or strips of motion picture film), each representing a take. Each take corresponds to a portion of a script. The takes are sometimes collectively referred to as "dailies," and are the raw material for the post-production editing process.

Each tape (or segment of motion picture film) is transferred to a laser video disk (or disks), so that the disks may be inserted into the video disk playback units of the invention. During offline editing, the editor may generate an edit list which characterizes the typical "first-cut" shown in the upper right corner of FIG. 1. This first cut consists of concatenated portions of each of the five takes, which define an edited show.

More specifically, during offline editing the editor identifies group "A" of frames from the first disk as the first "edit" on the list. The editor then identifies group "B" of frames from the first disk as the second edit, group "C" of frames from the second disk as the third edit, group "D" of frames from the third disk as the fourth edit, group "E" of frames from the fourth disk as the fifth edit, group "F" of frames from the fourth disk as the sixth edit, group "G" of frames from the fifth disk as the seventh edit, and group "H" of frames from the fifth disk as the eighth edit.

Of course, the editor may choose to revise the initial edit list. For example, the editor may decide that the first splice (the transition between the last frame of edit "A" and the first frame of edit "B") should be a wipe (or a dissolve), rather than a simple cut. The editor would accordingly supplement the edit list to include this "splice" information.

Figure 2:
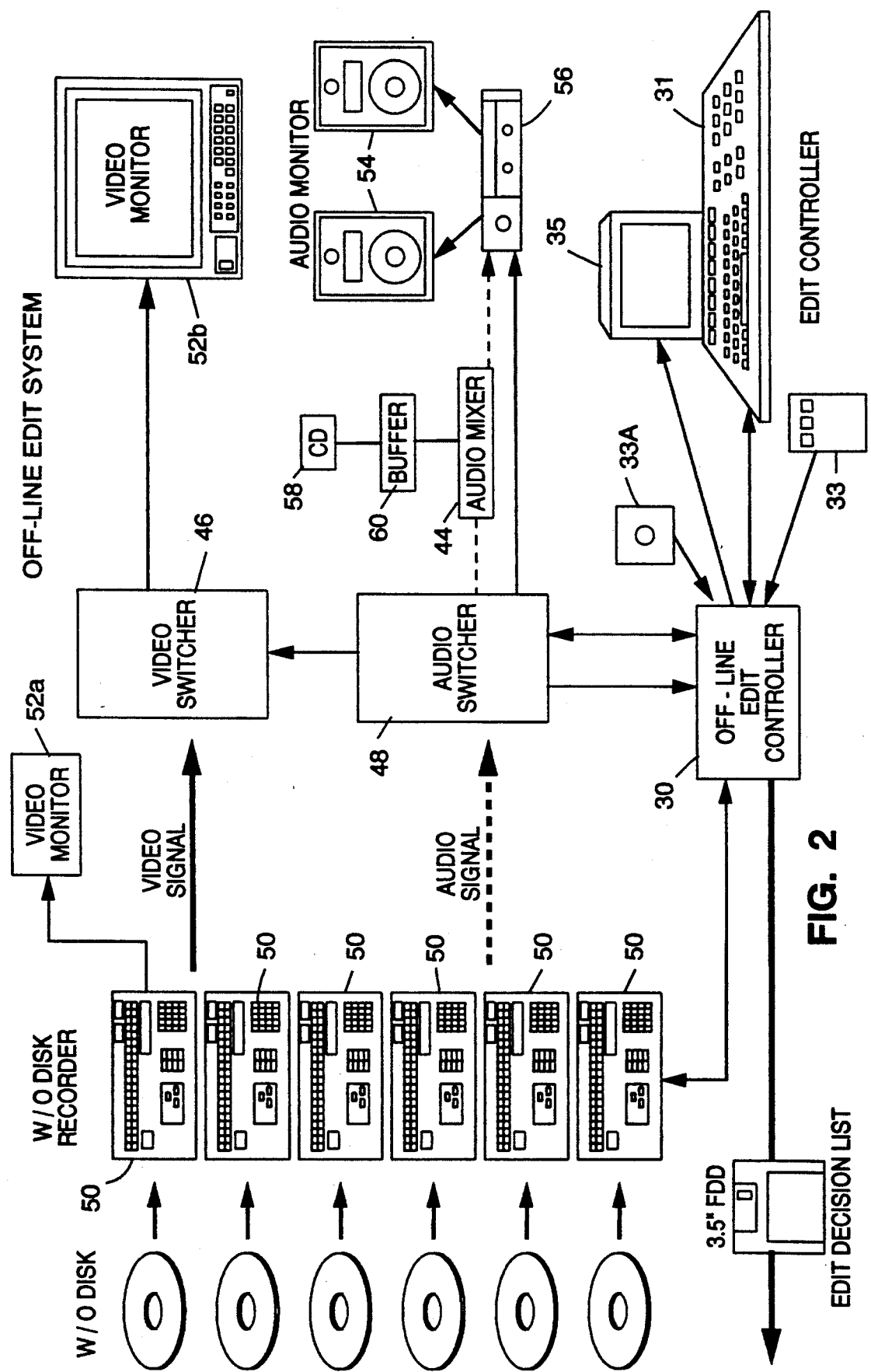
FIG. 2 is a schematic diagram of a preferred embodiment of the invention.

In the preferred embodiment of FIGS. 2–7, the invention includes a programmed computer 30 (including offline editing control hardware and software) for generating the edit list in the form of a computer file (so that the edit list may be written by computer 30, for example, on a 3.5 floppy diskette, as indicated in FIG. 2).

The user interfaces with computer 30 using computer monitor 35, mouse 33, and computer keyboard 1. Computer 30 controls up to six laser video disk units 50, with each of units 50 preferably including a means 50b (shown in FIGS. 4 and 5) for playing a laser video disk (on which unedited takes may be stored) and a means 50a for writing once on a laser disk (for example, to record selected takes being played by other ones of units 50). Sony LVR-5000 and LVS-5000 video disk units are suitable for use as means 50b and 50a, respectively.

Figure 4:
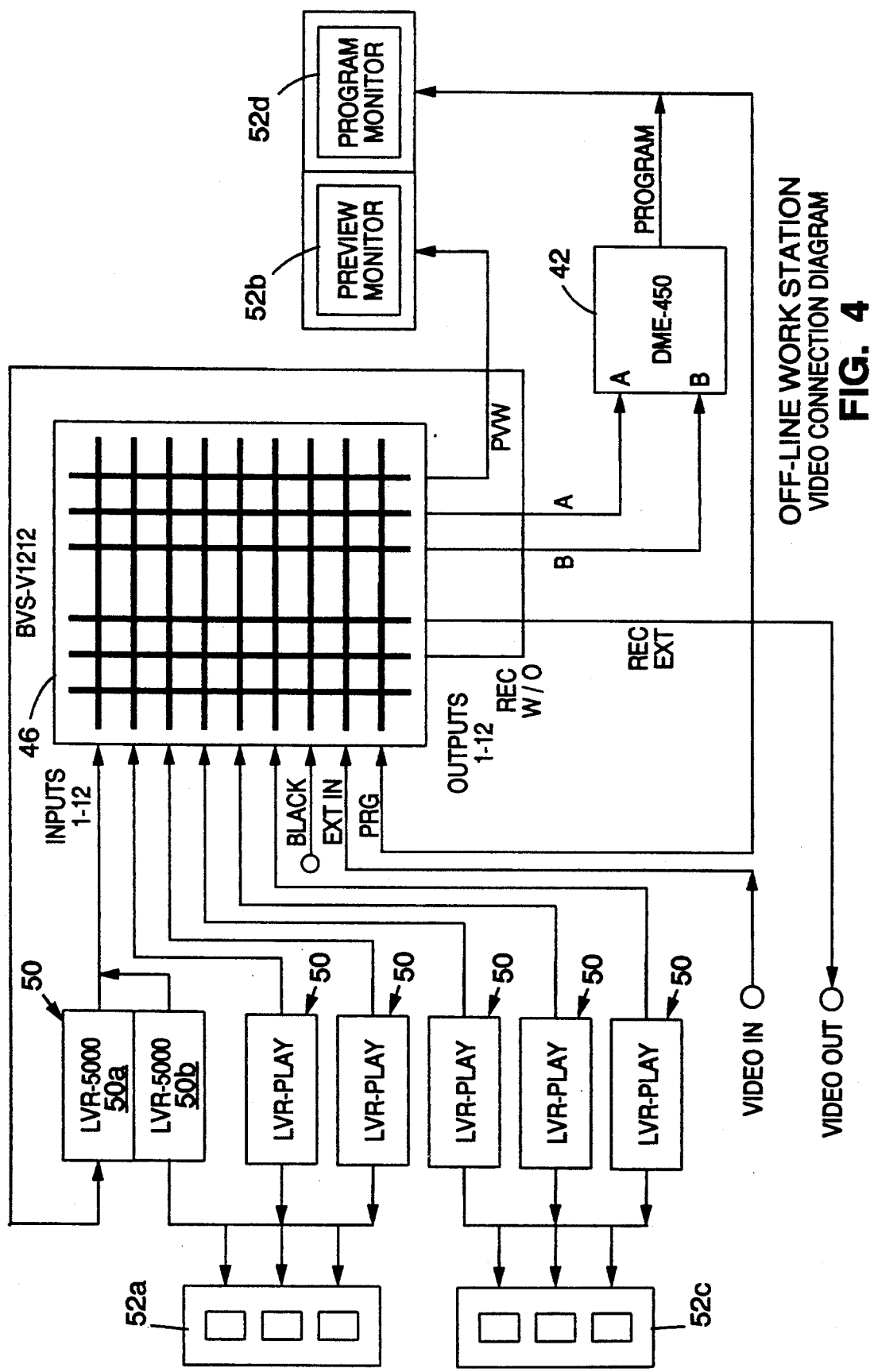
FIG. 4 is a block diagram of a portion of the FIG. 1 system, showing hardware connections for video signals.

The video signals output from units 50 are routed to one or more video monitors 52a, and through video switcher 46, operating under the control of programmed computer 30, to one or more video monitors 52b. Only one monitor 52a and one monitor 52b is shown in FIG. 2 for simplicity, but a total of eight video monitors (52a, 52b, 52c, and 52d) are shown in FIG. 4. A Sony BVS-V1212 video routing switcher is suitable for use as switcher 46.

The audio signals output from units 50 (typically a left and right audio channel for each unit 50) are routed through audio switcher 48, operating under the control of programmed computer 30, to stereo amplifier 56 and speakers 54. An additional audio siqnal (for special effects) is output from audio CD player 58, through buffer 60 to audio mixer 44, in which it may be mixed with desired signals from unit 48 before amplification in amplifier 56. A Sony BVS-A1201 audio routing switcher is suitable for use as switcher 48.

Figure 3:
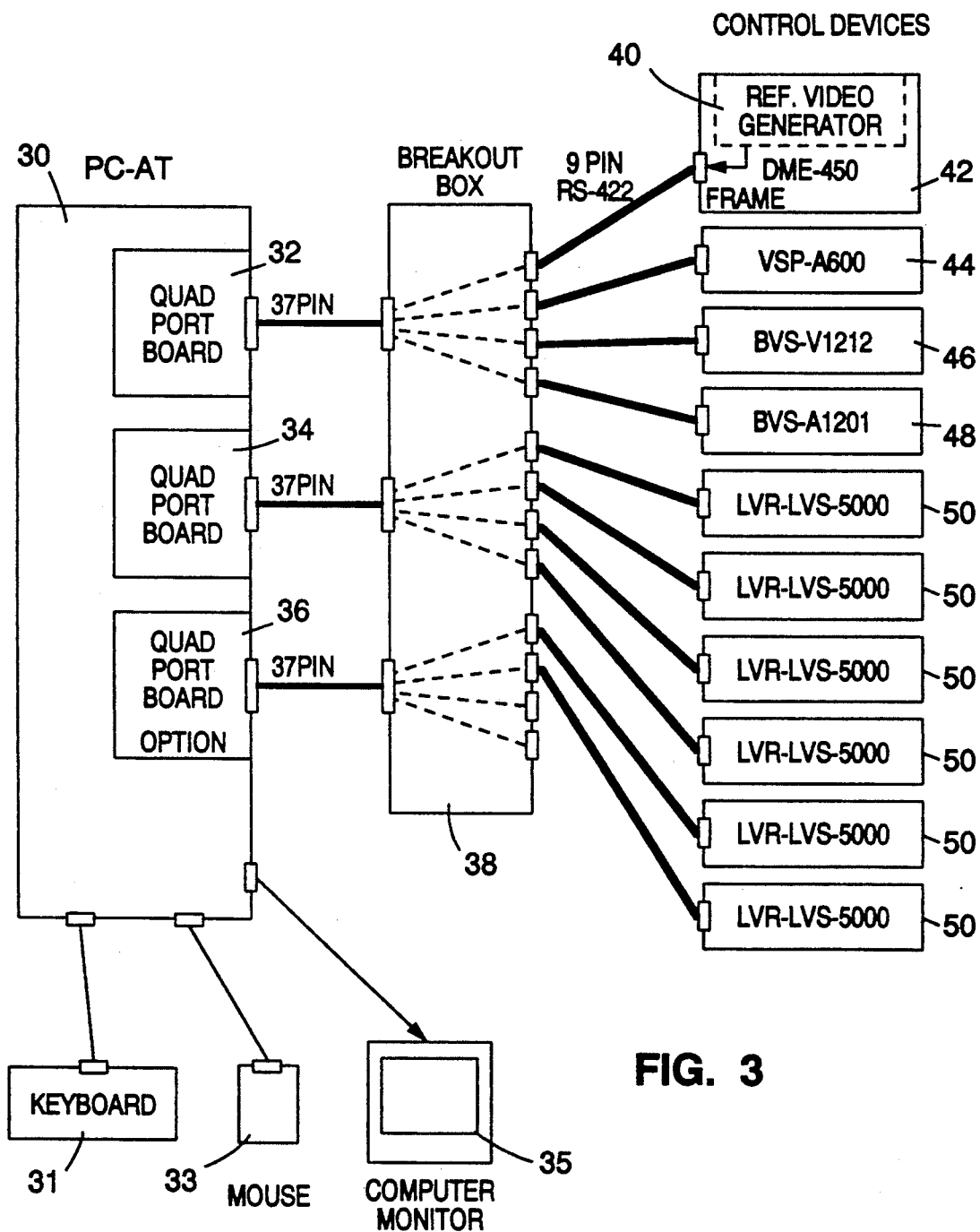
FIG. 3 is a block diagram of a portion of the FIG. 1 system, showing hardware connections for control signals.

With reference to FIG. 3, programmed computer 30 communicates with video special effects unit 42 (which includes video signal generator 40), audio mixer 44, switchers 46 and 48, and video disk units 50, through "quad port" boards 32, 34, and 36, and breakout circuit 38. Unit 42 is not shown in FIG. 2 for simplicity.

Preferably, computer 30 is an IBM AT personal computer (or a compatible "AT" computer), and each of boards 32, 34 and 36 is connected within a standard IBM AT slot of the computer. The function of circuits 32, 34, 36, and 38 is to enable computer 30 to control up to twelve peripheral devices through three un-modified slots of the computer. Circuit 38 includes twelve 9-pin RS-422 ports, for connection to the twelve peripheral devices shown in FIG. 3. Four such RS-422 ports are connected to each of the three 37-pin ports of box 38, and each such 37-pin port is connected to a different 37-pin port of board 32, 34, or 36.

A frame reference signal from video signal generator 40 (which may be a Sony Model BVS-3200 signal generator) will cause an interrupt to computer 30 through quad port board 32, to synchronize the communication for device control to video frame time.

Video special effects unit 42 (which may be a Sony DME-450 digital multi effects device) should be capable of processing the stored takes to simulate various video signal transitions between edits (such as dissolves, fades, and wipes), to enable the user to view shows defined by edit lists which specify such video signal transitions.

Similarly, audio mixing unit 44 (which may be a Sony VSP-A600 audio mixing device) should be capable of generating audio signal transitions such as audio crossfades, to enable the user to listen to the audio track of shows defined by edit lists which specify such audio transitions.

With reference to FIG. 4, the video playback output of each of the upper three video disk units 50 is connected to a diff,erent video monitor within group 52a of video monitors, and the playback output of each of the lower three video disk units 50 is connected to a different video monitor within group 52c of video monitors. The playback output of each video disk unit 50 is also connected to an input of video switcher 46. An output of switcher 46 is also connected to video disk recording unit 50a within the top unit 50, so that the video output of switcher 46 may be recorded on a disk within unit 50a. One or more of the other units 50 may also include a recording unit, connected to switcher 46 in the same way as is the top unit 50.

Two outputs of switcher 46 are connected to the inputs of video special effects unit 42, whose output is connected to video monitor 52d and to an input of switcher 46. Another output of switcher 46 is connected to video monitor 52b.

Figure 5:
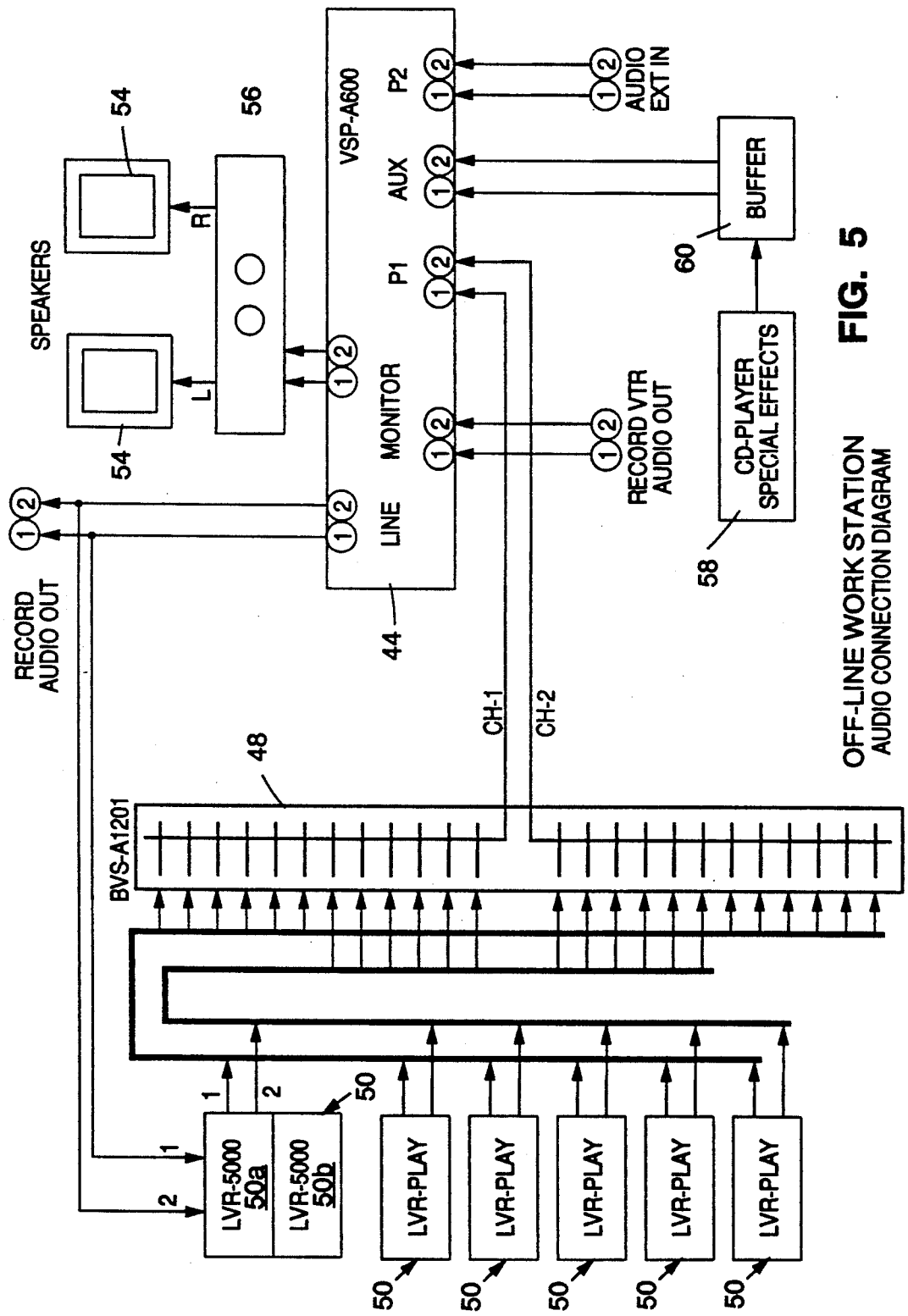
FIG. 5 is a block diagram of a portion of the FIG. 1 system, showing hardware connections for audio signals.

With reference to FIG. 5, the audio playback output (including a left and a right audio channel) of each of the upper three video disk units 50 is connected to an input of audio switcher 48. The line output of audio mixing unit 44 is also connected to the left and right inputs of recording unit 50a within the top unit 50, so that the audio output of mixing unit 44 may be recorded on a disk within unit 50a.

The output of audio CD player 58 is supplied through buffer 60 to left and right inputs of mixing unit 44, so that such audio signals may be mixed with audio signals from switcher 48. The left and right outputs of mixing unit 44 are connected to audio amplifier 56, and the amplified left and right audio channels are sent to pair of speakers 54.

Figure 6:
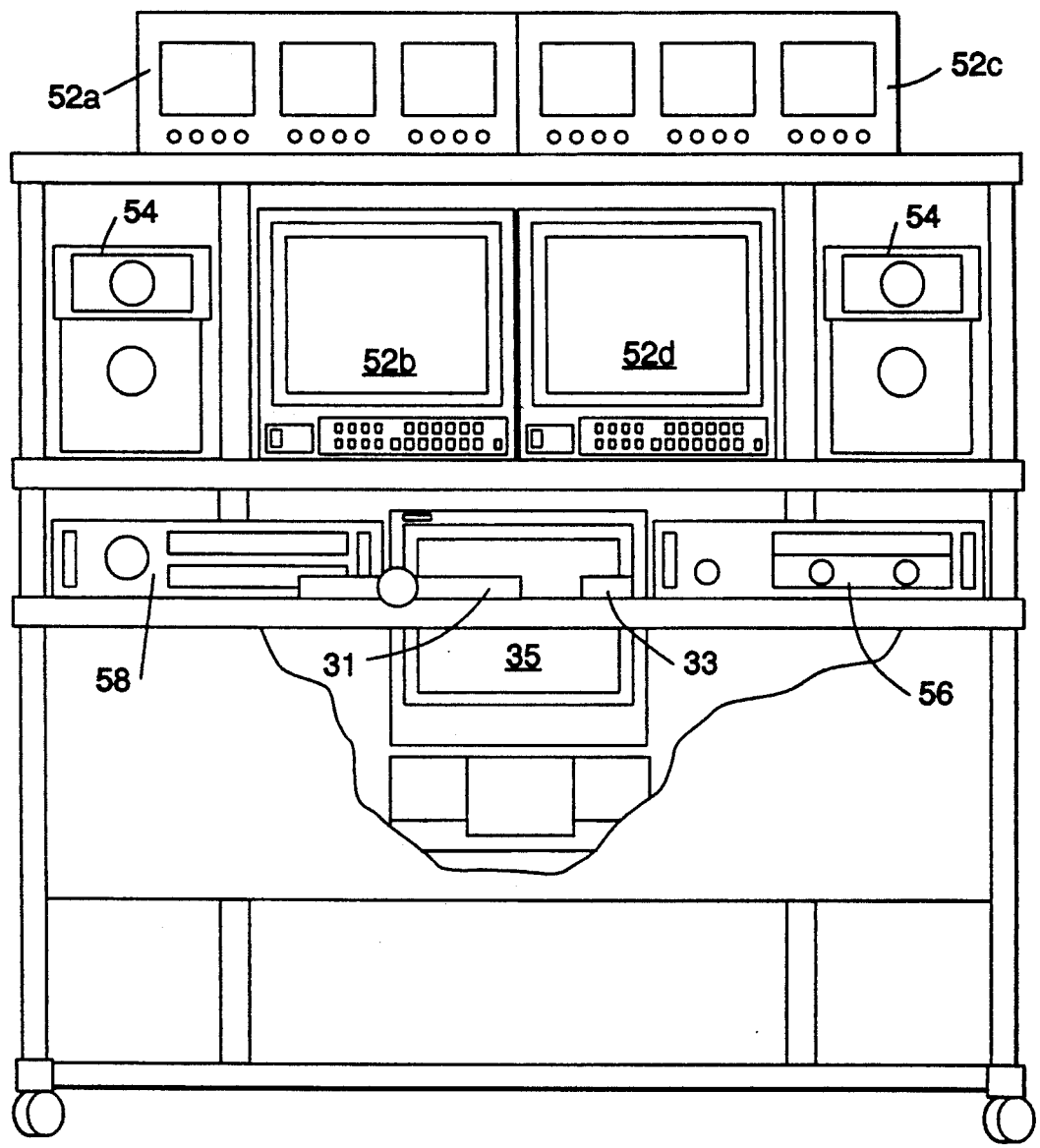
FIG. 6 is a front view of a console portion of the FIG. 1 system.

Preferably, video monitors 52a, 52b, 52c, and 52d, computer monitor 35, audio speakers 54, audio amplifier 56, CD player 58, computer keyboard 31, and mouse 33 are mounted on a oonsole rack as shown in FIG. 6. With the arrangement of FIG. 6, a user may conveniently view the video monitors (and thus focus his or her attention on the frames being displayed), while manipulating the mouse in order to enter edit decisions into the system. At other times during the editing process, a user may conveniently view the computer monitor while typing computer commands using the keyboard or entering computer commands using the mouse.

Figure 7:
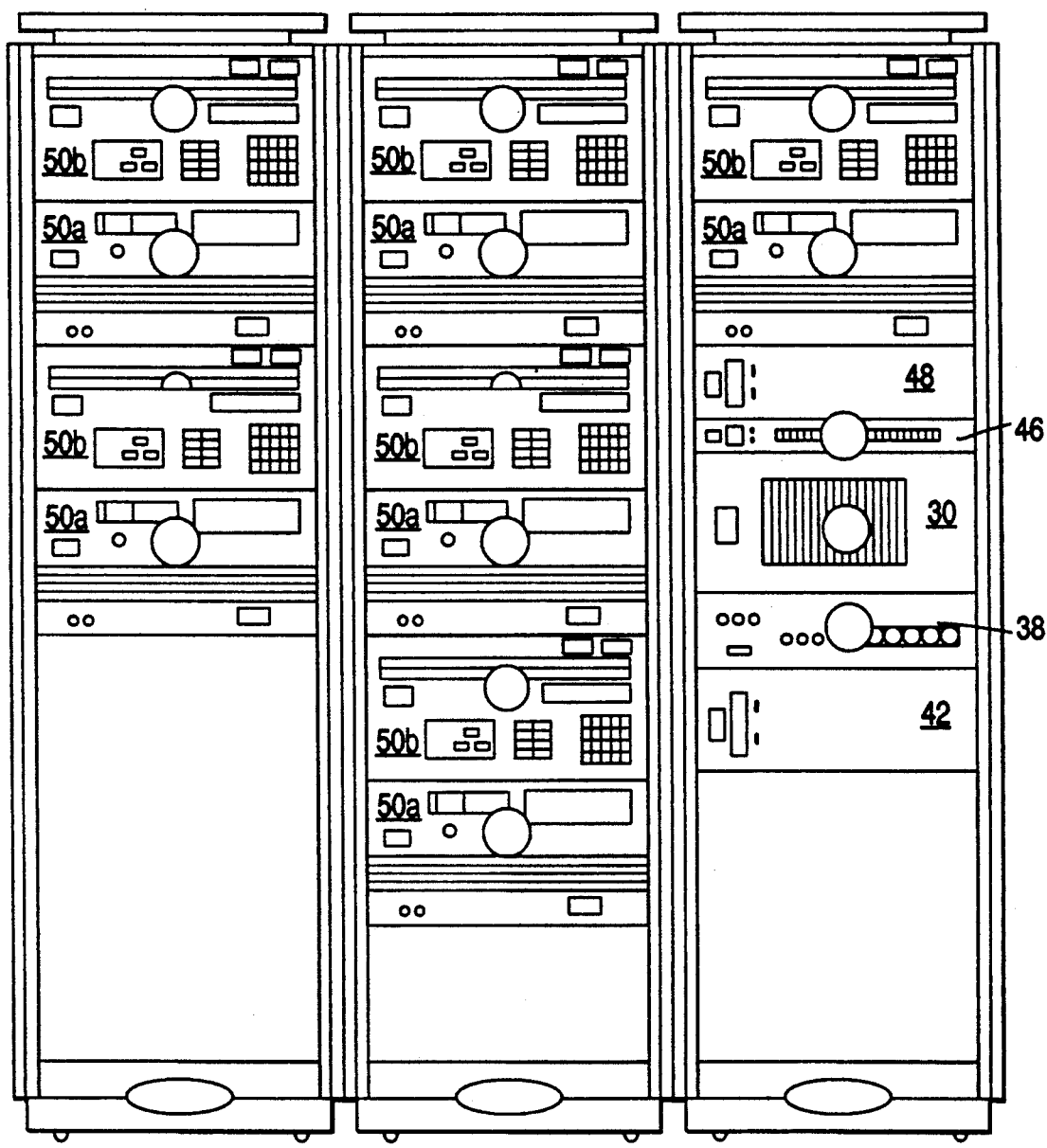
FIG. 7 is a front view of an equipment rack portion of the FIG. 1 system.

Preferably also, six video disk units 50 (each including a laser video disk recorder 50a and a player 50b), programmed computer 30, breakout box 38, video special effects unit 42, video switcher 46, and audio switcher 48, are mounted on an equipment rack portion as shown in FIG. 7.

Figure 8:
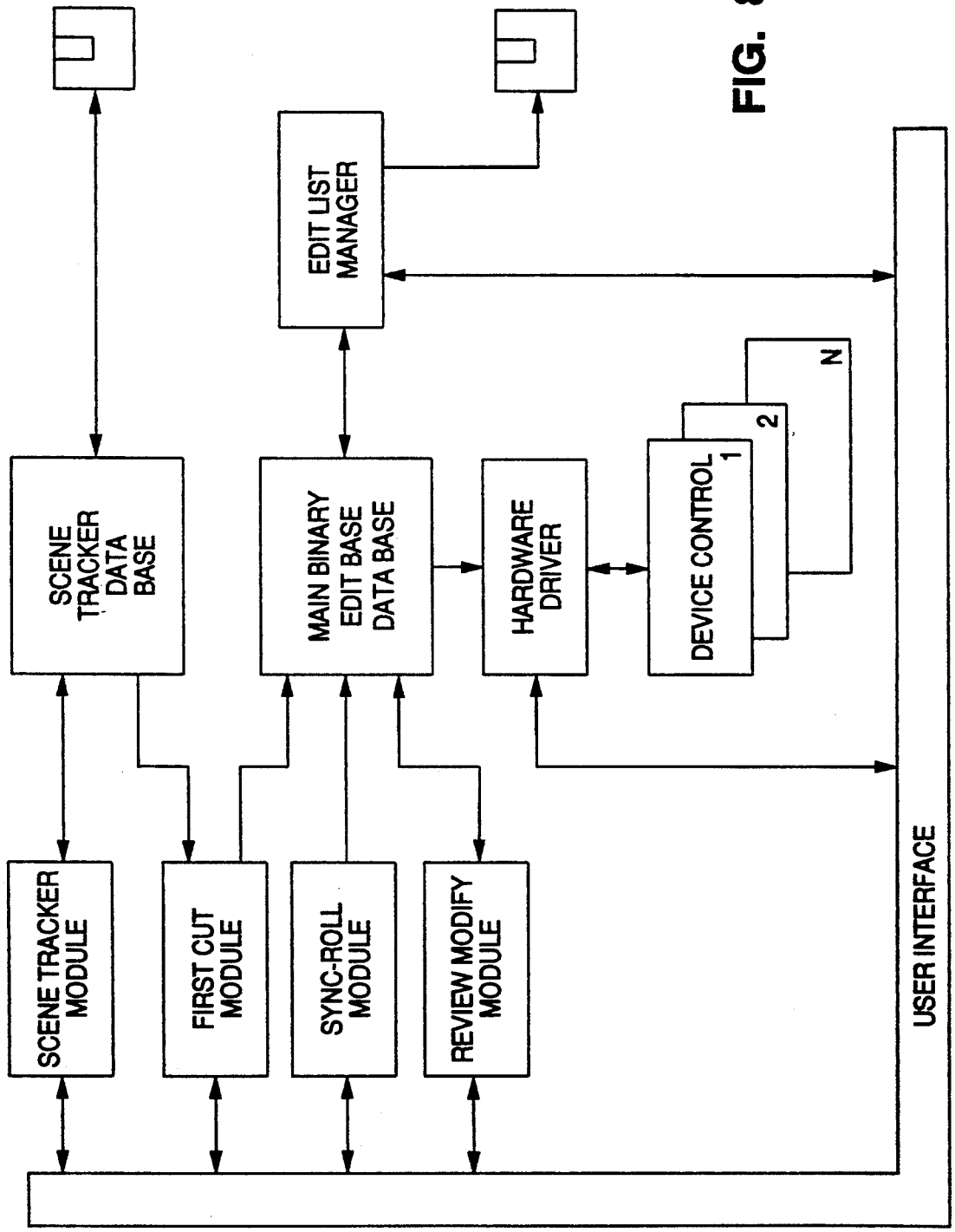
FIG. 8 is a diagram representing the functionality of the software of the invention.
Figure 9:
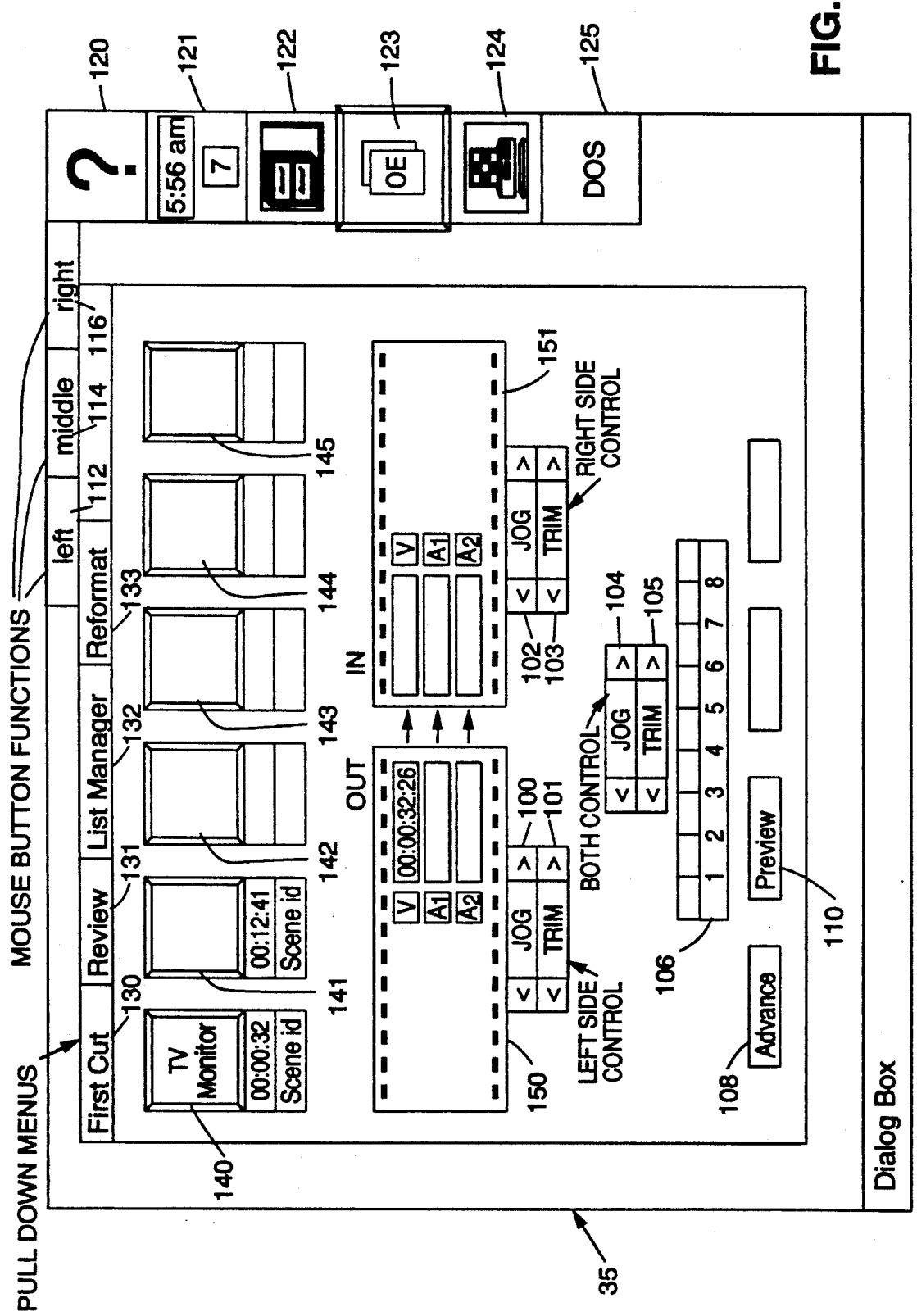
FIG. 9 is a typical display produced by the user interface of the invention on the computer monitor of the invention.

With reference to FIG. 8, programmed computer 30 includes: hardware driver software for controlling the video and audio peripheral devices of the system (including device control routines for each type of peripheral device employed in the system); scene tracker software (enabling the user conveniently to log unedited takes into the system, and generate lists of logged takes); edit decision software; and user interface software, which is capable of accessing the other system software in response to commands entered by the user using mouse 33 or keyboard 31 and is capable of generating displays of the type shown in FIG. 9 on computer monitor 35's screen.

The scene tracker software enables the user conveniently to log unedited takes into the system in either of two ways (depending on whether the unedited takes are stored on videotape or on video disks). First, if the user starts with video tape versions of the unedited takes, the scene tracker module allows the user to cue individual videotaped takes (when video tape players have been connected to the system to play back the takes), mark "in" and "out" frames of the takes being played back, and copy the marked takes onto a video disk (storing not only the first and last frame time codes of the original videotaped version of each copied take but also the first and last frame time codes of the new video disk version each copied take). Alternatively, when the user starts with video disk versions of the unedited takes, the scene tracker moduel prompts the user to mark "in" and "out" frames of desired ones of the takes, and stores in the "in" and "out" (first and last) frame time codes of each marked take (i.e., the scene tracker module logs the marked takes).

The scene tracker module also prompts the user to enter descriptions of logged takes (using computer keyboard 31), and stores the user-entered descriptions. Additionally, the scene tracker module allows the user to revise the descriptions of the logged takes, and to add or delete selected takes to the scene tracker data base (which data base includes the addresses and descriptions of the logged takes).

The edit decision software includes the "first cut" module, "sync-roll" module, "review modify" module, and "edit list manager" module shown in FIG. 8.

The first cut module enables the user conveniently to generate an edit list from logged, unedited takes. The edit list includes time codes identifying the splices between editsw on the list, codes identifying the type of each splice (i.e., wipe, dissolve, fade, or simple cut), and user-entered descriptions of the edits on the list.

The "review modify" module enables the user to revise an already-generated edit list (while viewing selected video takes), and to view a show defined by an already-generated edit list (i.e., to cause the video tape players to simulate the show by sequentially playing back the edits on the edit list).

The sync-roll module enables the user to view simultaneously a set of synchronized takes (i.e., takes produced by a number of synchronized cameras) on a number of video monitors, wile marking "in" and "out" frames of desired ones of the takes to generate an edit list.

The edit list manager module displays test prompts for prompting the user to manipulate already-generated edit lists (for example by changing the description of an edit or block of edits on the list, or by copying a sequence of edits to another location on the edit list).

Within the first cut module, and each of the other modules described with reference to FIG. 8, are user-selectable subroutines (also denoted herein as "modules") to be described below with reference to FIG. 9.

The user interface software provides an integrated software environment in which the user has global access to a variety of video post production environments, including the scene tracker, first cut, sync-roll, review modify, and edit list manager modules described above. Specifically, the user interface displays user-selectable icons and mnemonic text (representing software modules) enabling the user to access a desired software module (in which a full-screen or pull down menu may be displayed) at any stage during an offline editing operation. The icons (or windows including test) may be selected by the user using a mouse.

FIG. 9 is a typical display generated by the system's user interface software during operation of the system of the invention. Global icons appear in the upper right area of the screen. The user may command the system to execute a software application module of the inventive software by actuating a mouse to select the icon corresponding to the module. For example, the user may select icon 120 (a graphic representation of a question mark) to execute a "help" module; icon 121 to command the system to display the current data and time; icon 122 (a perspective view of a file cabinet, with drawers for containing project files) to execute a "project selection" module in which the system displays a menu including a list of previously created editing project files; icon 123 (a perspective view of a stack of papers with the initials "OE" on the first paper in the stack) to execute a module enabling the uer to select one of the modules described above with reference to FIG. 8 (and thus to reconfigure the display screen); icon 124 (a perspective view of a video special effects device resembling the Sony DME-450 digital multi effects device) to execute a "special effects" module (in which the system displays a menu enabling the user to control a digital special effects device to simulate desired transitions between user-specified frames); and icon 125 to access the computer's operating system.

Upon moving a displayed cursor onto an icon using mouse 33, the icon will become highlighted (as is icon 123 in FIG. 9). The user may select a highlighted icon by "clicking" one of the buttons on the mouse (three such buttons are shown in FIG. 2).

Mnemonic text appears in windows along the top and bottom edges of the screen, such as windows 108 and 110. The user may command the system to execute an application module by actuating a mouse to select the text window corresponding to the module. For example, the user may select text 108 ("Advance") to command the system to add the left edit (the edit whose time codes are currently displayed in window 150, and have been marked) to the edit list, move the right edit (the edit whose time codes are currently displayed in window 151, and have been marked) to left monitor 52b (and the move the displayed information from window 151 to window 50), and move the next edit (if any) on the edit list to right display screen 52d (and display the "in" time codes for such next edit in window 151).

For another example, upon selection of tet 110 ("Preview") the system will play (display on video monitor 52b) the last five seconds of the current left edit through the end of the current right edit. For another example, upon selection of "reformat" text window 133 along the top edge (immediately to the right of "edit list manager" window 132), the system might prompt the user to modify the position of the displayed windows and icons.

The user may cue a take in a variety of ways. For example, the user may select a video disk player and enter a desired time code (typically after accessint the scene tracker module to display a list of logged takes), and specify whether the take is to be the left or right edit. The time codes of the current left edit (for the video, left audio, and right audio channels) are displayed in window 150 (labeled "out") Similarly, time codes of the current right edit are displayed in window 151 (labeled "in"). Also in response to such cuing commands, the system's hardware driver software will physically prepare the disk to play back the selected take (for example, on left monitor 52b for a left edt, or on right monitor 52d for a right edit, as well as on the one of monitors 52a or 52c which corresponds to the selected disk player).

Alternatively, the user may select a video disk player and enter a project identification code (a code idenfitying an already-generated edit list). In this case, the system will cue the selected player to the beginning of the first edit on the identified edit list, display the time codes of this first edit in the "in" window, and display the first edit (as a right edit) on right monitor 52d.

Alternatively, the use may enter a project identification code (a code identifying an already-generated edit list), In this case, the system will cue the nearest disk player to the beginning of the first edit on the identified edit list, display the time codes of this first edit in the "in" window, and display the first edit (as a right edit) on right monitor 52d.

Additional application modules may be selected by choosing appropriate windows including icons or mnemonic text on the monitor, although not all such windows are shown in FIG. 9, for simplicity. Additional modules allowing the user to view selected edits (or edit sequences) include:

"Replay," in which the system starts at the beginning of the left edit and plays through the rest of the edits on an edit list;

"Restart," in which the system starts at a user-specified restart limit (time code) and plays through the rest of the edits on an edit list up to a second user-specified restart limit;

"Restart Limits," in which the system stores user-specified restart limits (time codes) for use in performing a "Restart" operation;

"Open," in which the system cues a pair of players at a specified splice (so that the user may view the last frame of the left edit juxtaposed with the first frame of the right edit);

"Rock and Roll," in which the system enables the user to view a specified splice at any speed in a forward or reverse direction.

When a laser disk player is cured to a particular frame, a corresponding one of windows 140-145 will display the time code of that frame, and the project identification number (or "scene id," as denoted in FIG. 9) identifying an edit list including the edit to which the frame belongs. It is contmplated that in a variation on the embodiment of FIGS. 2-7, monitors 52a and 52c will be deleted, and replaced by a means for displaying each cued frame in a picture-in-picture video window at one of locations 140-145 of the computer screen. In such variation, if a frame with SMPTE time code 00:00:32 is cured on a first of video disk players 50, that frame would be displayed in the "first" picture-in-picture window (window 140 in FIG. 9).

Additional modules allowing the user to mark edits include:

"Out," in which the system marks the time code of all three of the video, left audio, and right audio channels of the currently cued left edit (i.e., the three time codes currently identified in window 150);

"In," in which the system marks the time code of all three of the video, left audio, and right audio channels of the currently cued right edit (i.e., the three time codes currently identified in window 151);

"Edit," in which the system performs both the "In" and "Out" function;

"V," "A1," "A2," "VA1," "VA2," "A1A2," in which the system marks the time code of the current left edit and the time code of the current right edit for the indicated channels (i.e., for the video channel and the left audio channel in the case of module "VA1"); and "Trim," in which the system adds or subtracts a user-specified number of frames to or from specified channels on specified sides of a splice (the user may specify the left side of the splice by operating the mouse to select Trim icon 101, the right side of the splice by operating the mouse to select Trim icon 103, and both sides of the splice by operating the mouse to select Trim icon 105.

Additional modules allowing the user to end processing of a splice include:

"Advance" (described above with reference to window 108);

"Reset," in which the system will undo the most recent "Advance" operation);

"Store," in which the system will store the current edit list on a floppy diskette (or hard disk).

Additional modules allowing the user to modify edits about a selected splice include:

"Overlay" (after selecting this module, to overlay a video or audio edit on a specified left edit, the user specifies the overlay signal source, a begin time code within the left edit, a begin time code from the overlay source, and an end time code from either the left edit or the overlay source);

"Insert" (after selecting this module, to add a video or audio edit to the edit list at a point within a left edit, the user specifies a target itme code within the left edit, the insert signal source, a begin time code from the insert source, and an end time code from the isnert source); and "Delete" (after selecting this module, to delete a video or audio channel from a right edit, the user simply enters the channel to be deleted).

As mentioned above, video special effects unit 42 is provided to process selected takes to simulate special video transitions between edits (such as dissolves, fades, and wipes). If no special transitions are specified, the edit list will designate a simple "cut" splice between each pair of edits. On the other hand, the system allows the user to identify "special effects" splices on the edit list (so that for example, the edit list might specify that the second splice is a linear dissolve with a duration of "X" frames). The system software includes a special effects module (actuated by selecting icon 124) enabling the user to control unit 42, in order to view a show defined by an edit list which specifies such transitions. This special effects module will preferably include the following user-selectable modules:

"Dissolve," to command the system to simulate a dissolve of specified type upon playback of the edited show;

"Wipe," to command the system to simulate a wipe of specified type upon playback of the edited show;

"Fade," to command the system to simulate a fade of specified type upon playback of the edited show; and "Effects," in which the system prompts the user to select effects board options.

In a preferred embodiment, the system displays a graphical representation of the current edit list in window 106. In such representation, each splice is represented by a vertical bar (or the like), which may optionally be identified by a reference numeral. For example, in FIG. 9, eight bars, identified by reference numerals one through eight, are displayed in window 106 to indicate that the current edit list includes nine takes separated by eight splices. Preferably, when frames from adjacent edits on the edit list are identified in windows 150 and 151, the system will automatically highlight the vertical bar in window 106 corresponding to the splice between these two edits.

Upon selection of certain windows (i.e., first cut module window 130, review modify module window 131, edit list manager module window 132, and reformat window 133), the system will display a pull down menu to prompt the user to take further action.

In certain modules, specifically defined functions are displayed in windows 112, 114, and 116. Such functions may be selected by actuating, respectively, the left button of mouse 33, the middle button of mouse 33, or the right button of mouse 33 (left, middle, and right buttons are shown on mouse 33 in FIG. 2).

In one important example, the user may conveniently perform a laser video disk jog/shuttle function by operating mouse 33 in the following manner. After the user has positioned the cursor onto a desired one of jog/shuttle windows 100, 102, and 104 using the mouse, the user may actuate the left button to cue the disk player back by one frame (to the previous frame), or the right button to cue the disk player ahead by one frame (to the next frame).

In this situation, if the user actuates the middle button, the system interprets motion of the mouse in the following manner. As long as the user moves the mouse toward the left, the system will continuously cue the disk player in the reverse direction (to earlier frames). As long as the user moves the mouse toward the right, the system will continuously cue the disk player in the forward direction (to later frames). While in this "shuttle" mode, the user may exit the shuttle mode by actuating the right button, and may actuate various combinations of the left and middle buttons to command the system to change the speed or direction in which the disk player shuttles. In the shuttle mode (as in other modes), mnemonic text representing the mouse button functions will preferably be displayed in windows 112, 114, and 116.

For example, in the shuttle mode, actuation of the middle button might command the system to increase the shuttling speed, actuation of the left button might command the system to decrease the shuttling speed, and simultaneous actuation of the left and middle buttons might command the system to reverse the direction of shuttling.

If window 100 is selected, the jog and/or shuttle function of the "left" laser disk player (the laser disk player on which the frame identified in window 150 is cued) is enabled. If window 102 is selected, the jog and/or shuttle function of the "right" laser disk player (the laser disk player on which the frame identified in window 151 is cued) is enabled. If window 104 is selected, the jog and/or shuttle functions of both the right and left laser disk players are enabled.

Figure 10:
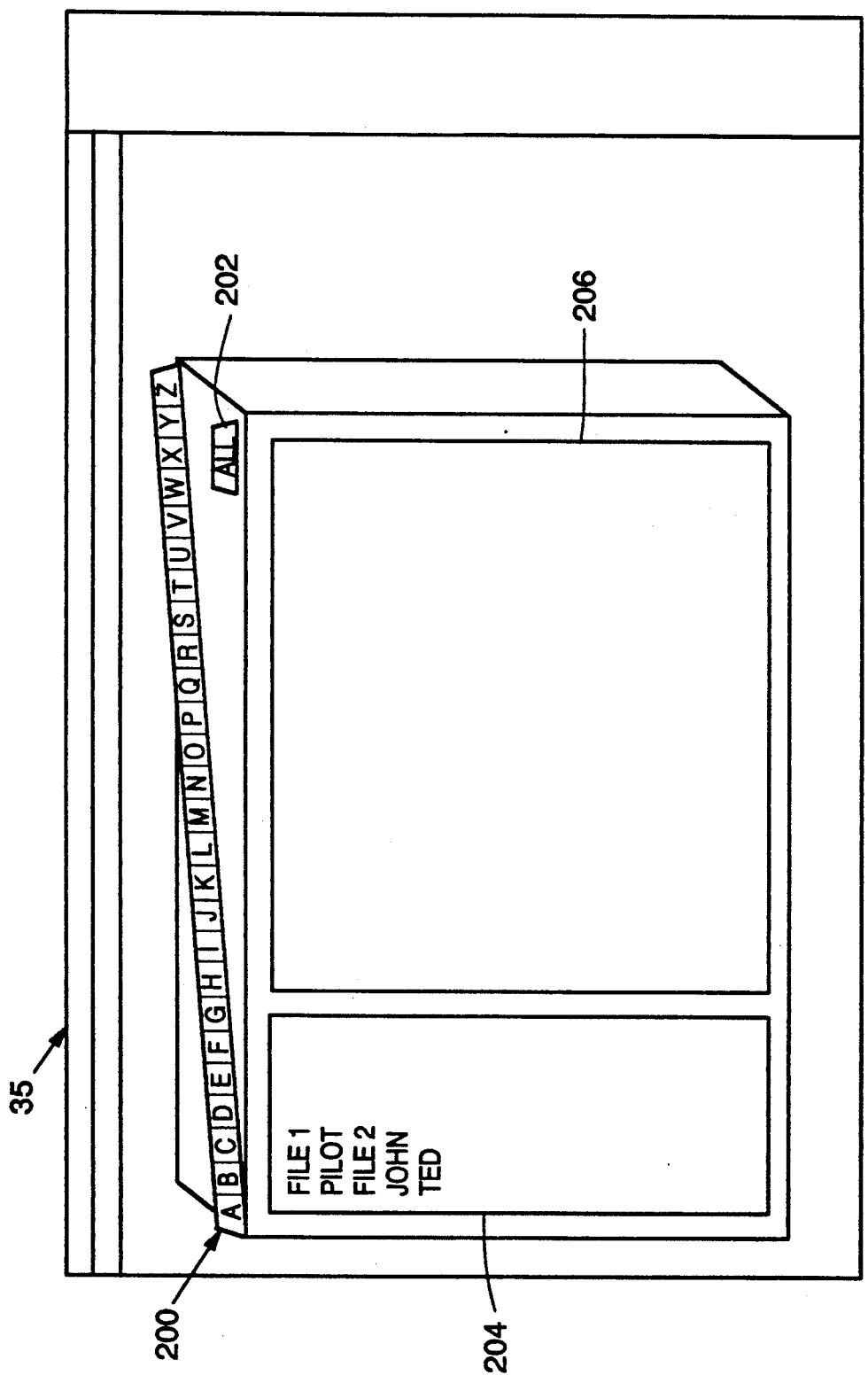
FIG. 10 is a display on the computer monitor of the invention, of the type produced by the project selection, module of the invention.

FIG. 10 is a typical display produced on monitor 35's screen upon selection of the project selection module of the invention (i.e., upon selection of icon 122 shown in FIG. 9). The "project folder" display of FIG. 10 includes alphabetically arranged "file" icons 200 and 202. Each of icons 200 represents a different letter of the alphabet, and icon 202 represents all letters of the alphabet. Upon selection of any of the file icons 200 and 202 using a mouse, the system will display a pulldown menu listing all computer files having names beginning with the corresponding letter (or letters) of the alphabet. The user may then select any desired file from the list on the pulldown menu. Even without selection of one of icons 200 and 202, a list of files will appear in window 204. By entering appropriate mouse commands, additional information regarding any of the files in window 204 will be displayed in window 206.

Figure 11:
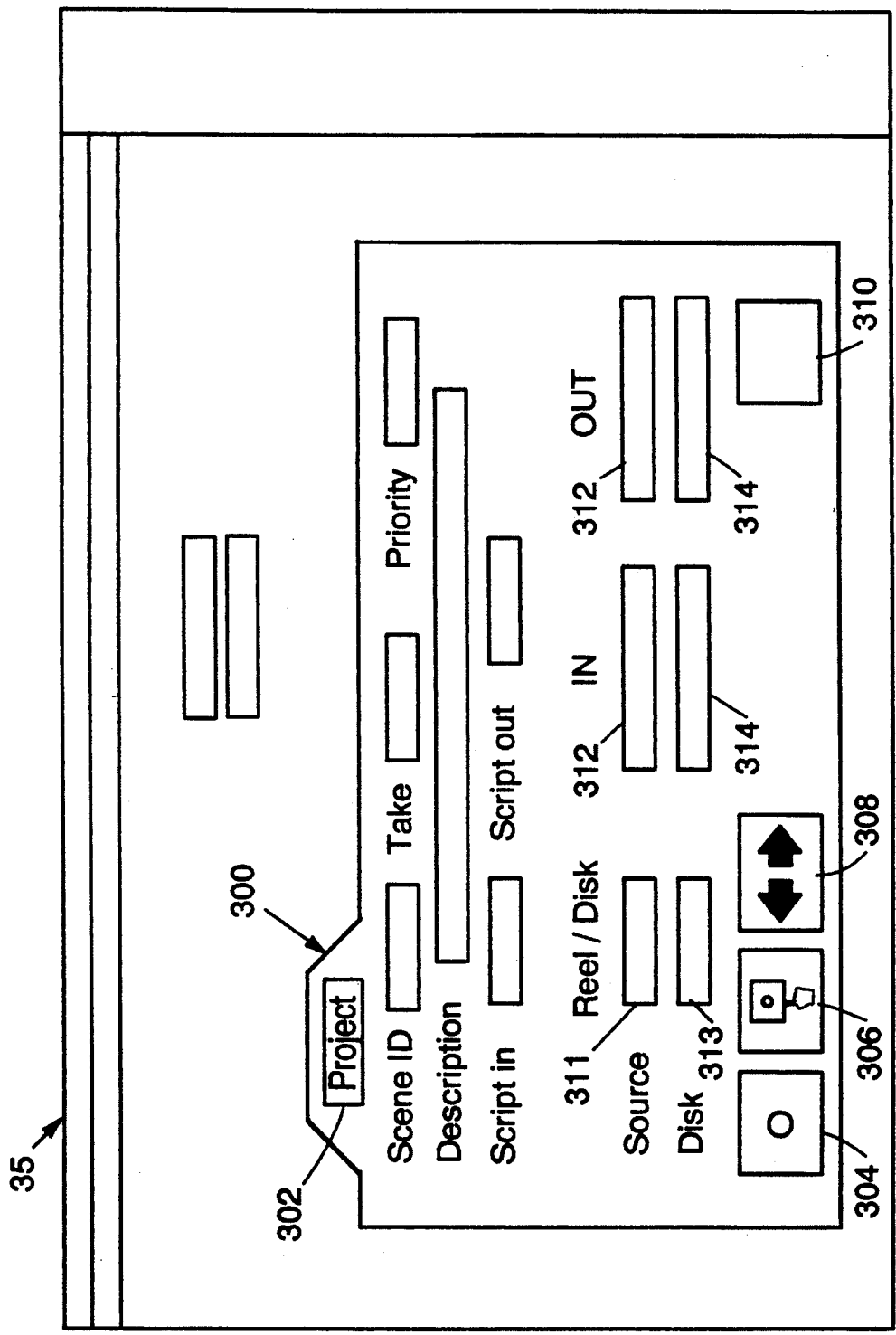
FIG. 11 is a display on the computer monitor of the invention, of the type produced by the scene tracked module of the invention.

FIG. 11 is a typical display produced on the screen of monitor 35 upon selection of the scene tracker module of the invention. The "index card" display 300 in FIG. 11 includes a window 302 for displaying a file name identifying the computer file in which the scene tracking information being entered by the user will be stored. While viewing takes (stored in videotape or laser video disk form), the scene tracker software displays (in windows 312) "in" and "out" frame time codes of the takes being viewed (i.e., time codes from the source tape or source video disk identified in window 311), and also displays (in windows 314) in and out frame time codes of video disk locations (of the disk identified in window 313) into which the user may choose to copy such takes. The "index card" display of FIG. 11 also provides additional windows in which the user may conveniently type information describing the take identified by time codes in windows 312 and 314. The display of FIG. 11 also includes icon windows 304, 306, 308, and 310, which may be selected by the user to perform various scene logging operations. For example, selection of icon 308 may instruct the system to display all information regarding another take that has previously been logged into the system (so that the user may revise previously-entered descriptive information regarding that take).

In a preferred embodiment of the invention, when the user initiates a session, the inventive user interface displays an initial menu prompting the user to select any of a variety of application modules, including a "display edit information" module; a "single camera" editing module; a "multiple camera" editing module (in which the user selects edits while simultaneously viewing scenes from two or more sources); and an edit list management module. Preferably, the user interface displays an icon for each module, so that the user may select a module by selecting the corresponding icon (such as by highlighting the icon and selecting the highlighted icon actuating one of the buttons of a mouse or other input device).

In one embodiment, the initial menu includes a set of icons 396-403 in the upper left portion of the display screen (as in the displays of FIGS. 12, 13, 15, and 16, to be discussed below). Of these, icon 400 corresponds to the "display edit information" module, icon 401 to the "single camera" editing module, icon 402 to the "multiple camera" editing module, and icon 403 to the edit list management module. Icons 396-399 may have any desired purpose (for example, to enable the user to access the operating system, or to access other applications modules, or the like).

Figure 12:
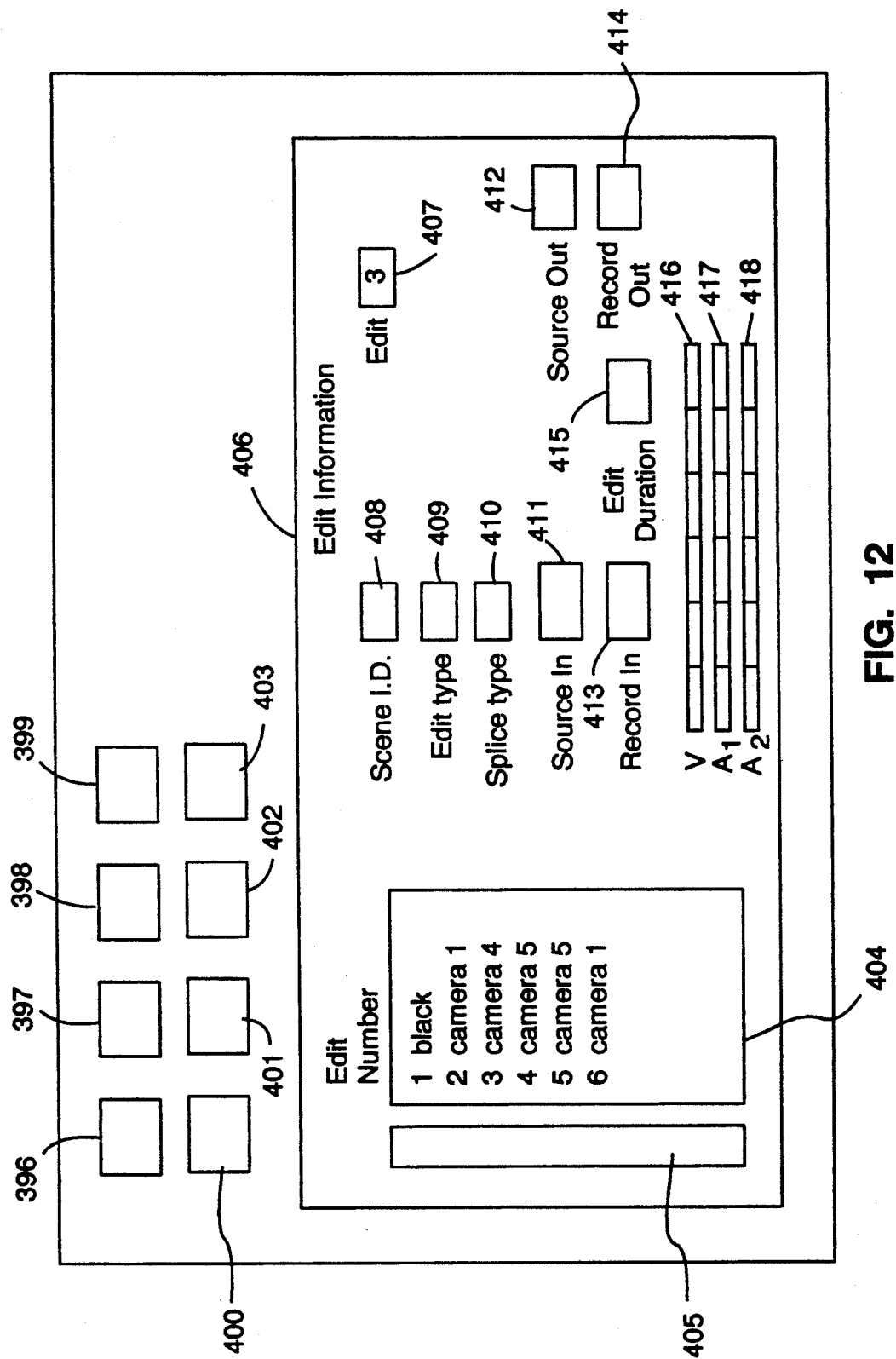
FIG. 12 is a computer monitor display of the type produced by the display edit information module of the invention.

If the user selects the "display edit information" module, a corresponding software module within the user interface generates (for display on monitor 35's screen) a display of the type shown in FIG. 12. The FIG. 12 display includes an edit list window 404 in which the edit list is displayed. In response to a user's selection of an edit from the edit list (such as by highlighting the region of window 404 containing the edit and actuating one of the buttons on a mouse or other input device), the right portion of display region 406 will show information about the selected edit.

For example, upon selection of the third edit within window 404, the corresponding edit number ("3") is displayed in area 407 of region 406, the corresponding scene ID number is displayed in area 408, the edit type and splice type are displayed in areas 409 and 410, respectively, the "in" and "out" frame time codes of the source (tape or video disk) from which the edit was chosen are displayed in areas 411 and 412, the "in" and "out" frame time codes of video disk locations into which the user has chosen to copy the edit are displayed in areas 413 and 414, and the duration of the edit is displayed in area 415.

The display of FIG. 12 also shows the entire edit list in graphical form in areas 416, 417, and 418. Each of areas 416–418 is divided into N segments, where N is the number of edits on the list, and each segment corresponds to a different edit. Each segment of area 416 is colored (or marked) to indicate whether the corresponding edit includes video information. The segments of areas 417 and 418 are also colored or marked to indicate whether the corresponding edit includes left and right channel stereo audio information, respectively. Upon selection of an edit within area 404, the system preferably highlights the corresponding segments of areas 416–418, for convenient inspection by the user.

Although FIG. 12 shows an edit list having only six edits in window 404, it is possible that the edit list will include too many edits for the complete list to be displayed in window 404 at any instant. Edit selection window 405 provides a convenient means for the user to scroll the edit list in window 404 (i.e., to cause a desired portion of the list to be displayed in window 404) and select a desired edit from the edits currently on display in window 404. When the user operates a mouse (or other input device) to highlight a vertical segment of window 405, the corresponding edit is displayed in window 404. Thus, if the user highlights the bottom-most segment of window 405, the system will scroll to the bottom portion of the edit list in window 404 and will highlight the last edit on the list in window 404. If the user then highlights the upper-most segment of window 405, the system will scroll upward to the top of the edit list in window 404 and highlight the first edit on the list in window 404.

While viewing the FIG. 12 display, a user may access either the "single camera" editing software module by selecting icon 401, the "multiple camera" editing module by selecting icon 402, or the edit list management module by selecting icon 403.

Throughout the remainder of the specification, including in the claims, the term "icon" will denote either an image or mnemonic text, displayed in a window on a display screen, which represents a software application module. We contemplate that the inventive system is programmed to execute each such software application module in response to user selection of the corresponding icon.

Figure 13:
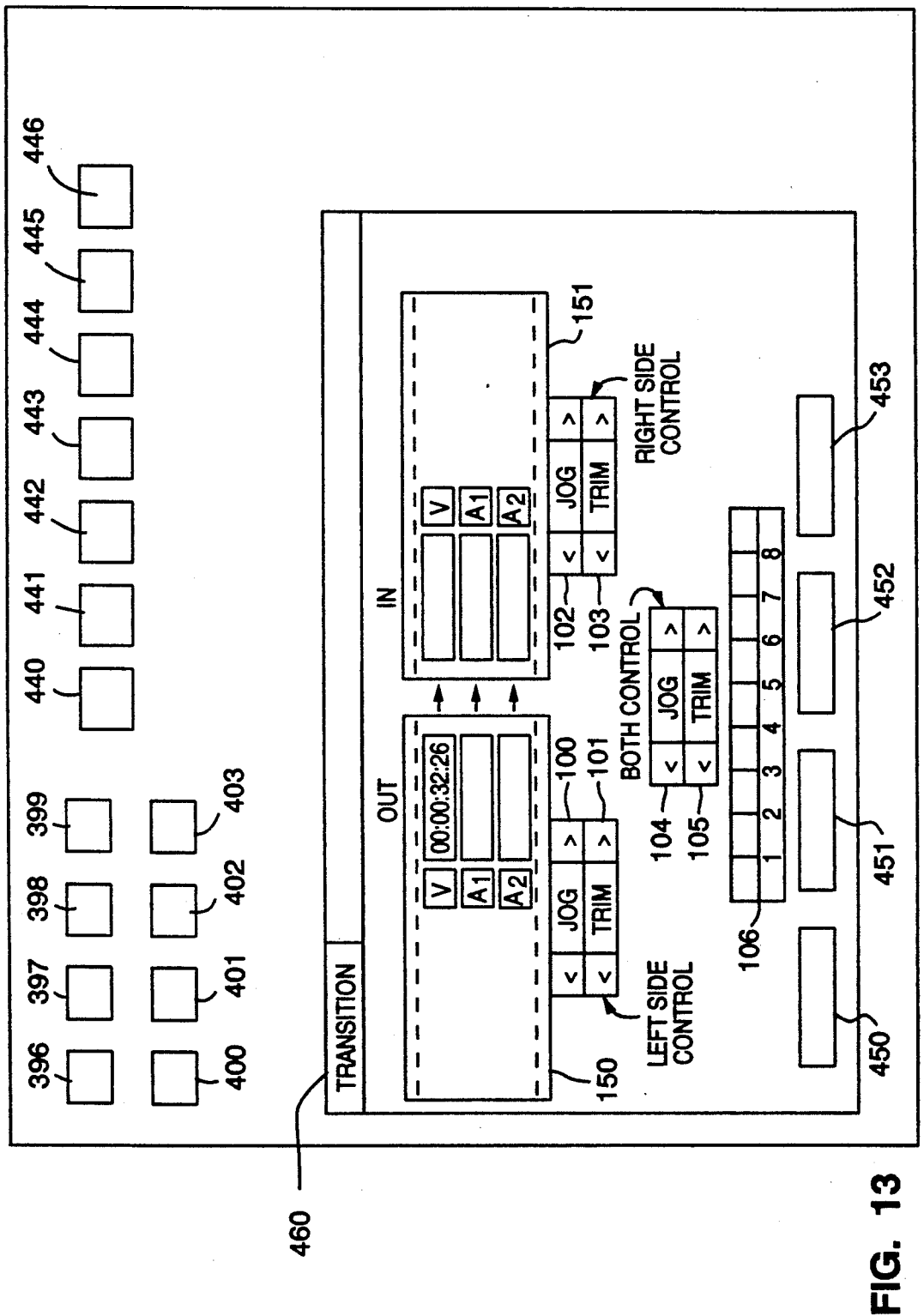
FIG. 13 is a computer monitor display of the type produced by the single camera style editing module of the invention.

In response to selection of icon 401 by the user, the system executes single camera style editing module (thereby entering the single camera style editing mode) and the user interface generates the FIG. 13 display for display on monitor 35. In the single camera style editing mode, icons representing six source takes are displayed simultaneously in source windows 441 through 446. At the same time, an icon representing a reference signal (i.e., a "black" reference signal) is displayed in window 440.

The user may access software modules for performing any of various editing functions by selecting icons displayed in windows (such as windows 450 through 453). For example, window 451 may display an "insert" icon representing software for inserting a new edit between adjacent edits on an existing edit list, window 452 may display an "overlay" icon representing software for inserting a new edit as a substitute for all or part of an edit on an existing edit list, and window 453 may display a "rehearse" icon representing software for playing back (on one or more of monitors 52a–52d) a show defined by an existing edit list.

The FIG. 13 display also includes icons 100–106, 150, and 151, which have identical functions to the identically numbered corresponding icons of the FIG. 9 display. In a preferred embodiment, the system is programmed to respond to jog/shuttle commands entered using trackball 33a (shown in FIG. 2) rather than mouse 33. In such an embodiment, rather than positioning mouse 33 onto a desired one of jog/shuttle windows 100, 102, and 104 and then manipulating the mouse to enter "jog" or "shuttle" commands for controlling one or more laser video disk players (in the manner explained above with reference to FIG. 9), the user may enter the same or similar "jog" or "shuttle" commands by analogous manipulations of trackball 33a.

The display of FIG. 13 also includes a "Transition" icon 460. In response to selection of icon 460, the system preferably displays a pulldown menu which prompts the user to enter additional commands in order to select a desired transition between a pair of edits.

Figure 14:
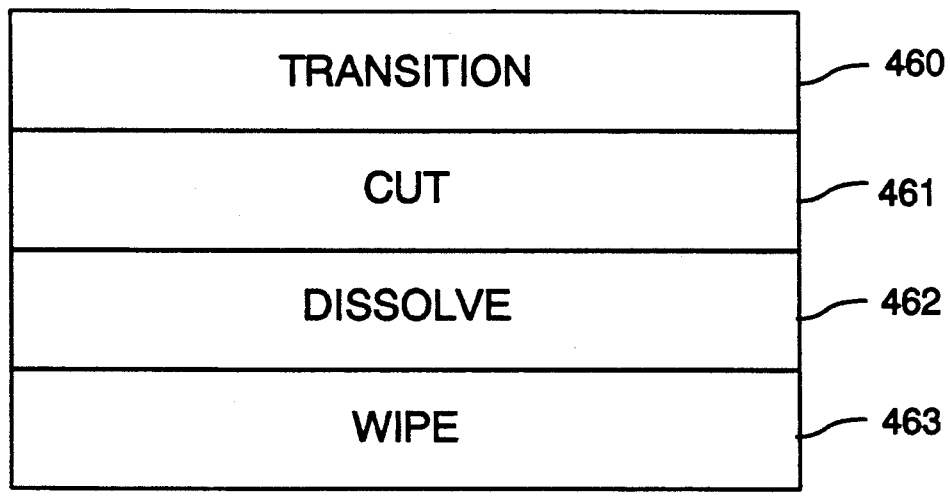
FIG. 14 is a computer monitor pulldown menu display of the type produced by the single camera style editing module of the invention.

FIG. 14 is an example of one such pulldown menu. The pulldown menu of FIG. 14 includes "Cut" icon 461, "Dissolve" icon 462, and "Wipe" icon 463. In response to selection of icon 461, the system will specify a "cut" transition between a previously selected pair of edits.

Figure 14A:
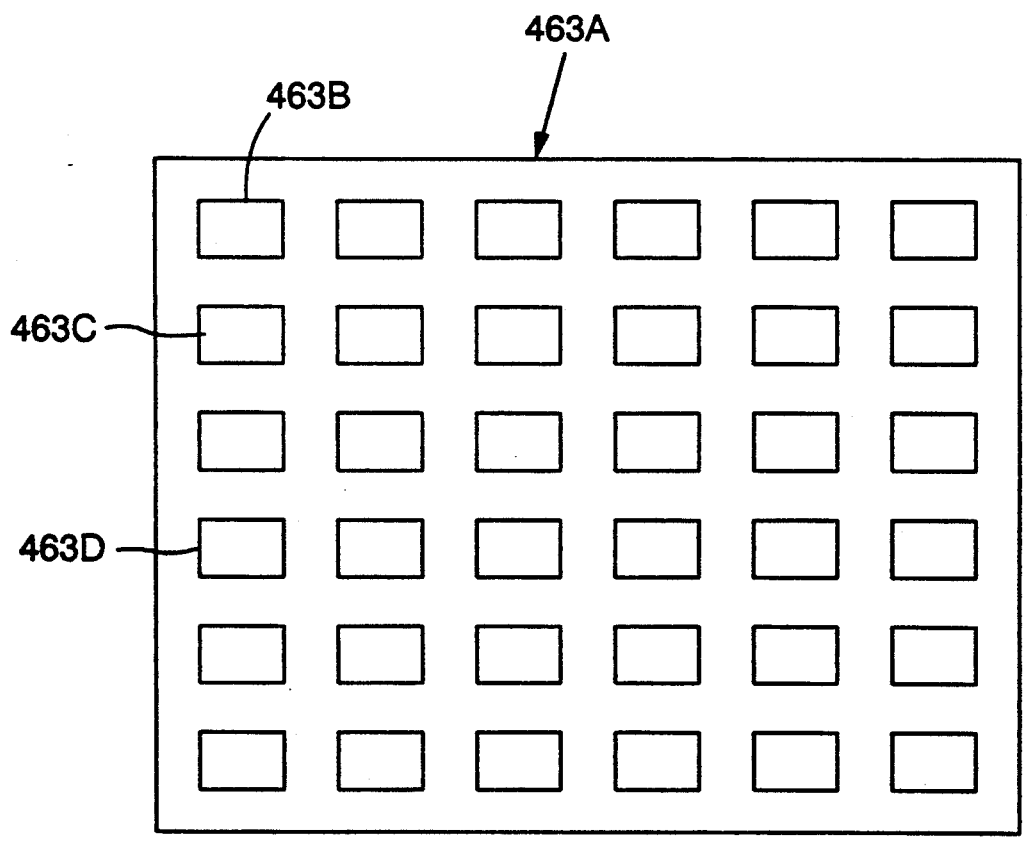
FIG. 14A is a computer monitor pulldown menu display of the type produced by selecting area 463 of the FIG. 14 display.

In response to selection of icon 463, the system will preferably display an additional pulldown menu prompting the user to select a particular type of "wipe" transition between a previously selected pair of edits. Menu 463A of FIG. 14A is an example of such an additional pulldown menu. Menu 463A includes a set of icons, each representing a different type of wipe transition. Thirty-six such icons are shown in FIG. 14A, although of course, less than thirty-six or more than thirty-six could alternatively be included. Thus, for example, icon 463B may represent a wipe from left to right (horizontally) across the video display screen, icon 463C may represent a wipe in a diagonal direction from the lower right corner to the upper left corner of the video display screen, and icon 463D may represent a "diamond-shaped" wipe outward from the center to the outer edges of the video display screen. Of course, upon selection of any of the icons of FIG. 14A, the system will prompt the user to specify also the duration of the desired transition.

In response to selection of icon 462 from the menu of FIG. 14, the system will preferably display an additional pulldown menu prompting the user to select a particular type of "dissolve" transition between a previously selected pair of edits, and to specify the duration of the desired transition.

Figure 15:
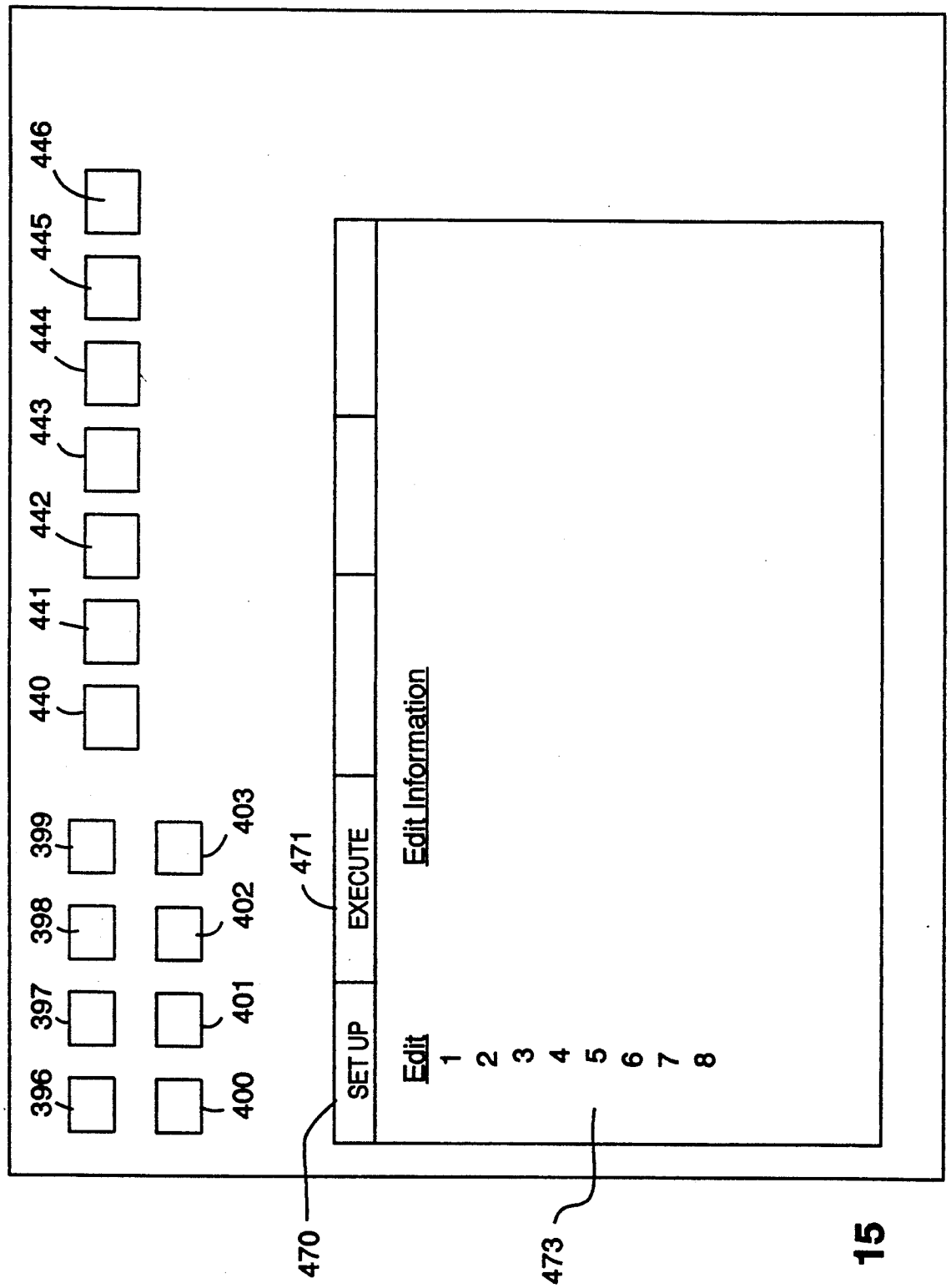
FIG. 15 is a computer monitor display of the type produced by the multiple camera style editing module, of the invention.
Figure 16:
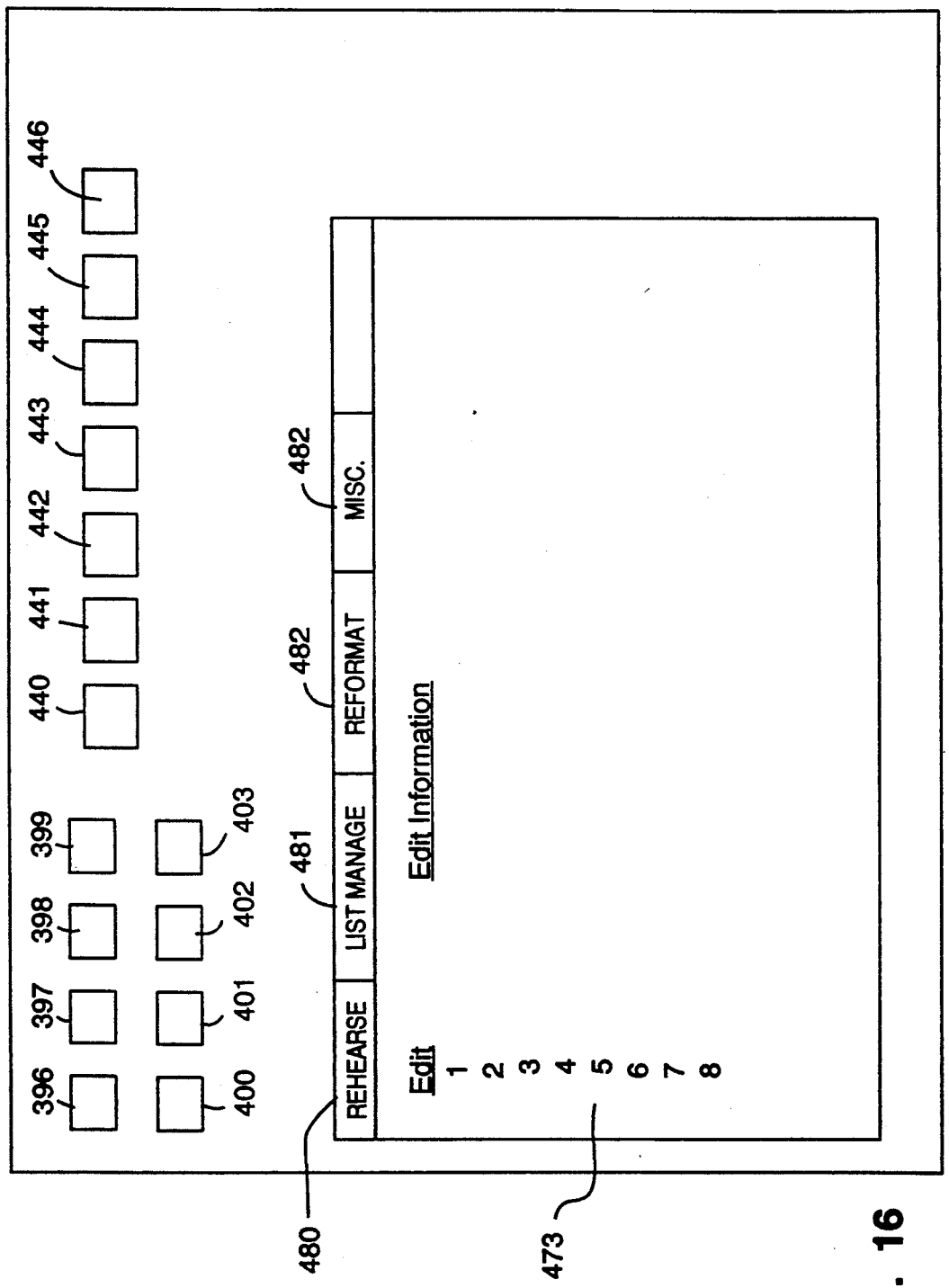
FIG. 16 is a computer monitor display of the type produced by the edit list management module of the invention.

If the user selects icon 402 from any of the FIG. 12, 13, or 16 displays, the system will enter the multiple camera style editing mode, and the system's user interface will generate the FIG. 15 display on monitor 35. In the multiple camera style editing mode, icons representing six source takes are displayed simultaneously in source windows 44 through 446. At the same time, an icon representing a reference signal (i.e., a "black" signal) is displayed in window 440. At the instant the user selects one of the icons within windows 441–446 (such as by sequentially highlighting desired ones of windows 441–446 using a mouse or trackball, computer 30 marks the frame currently displayed by the corresponding one of video monitors 52a–52d as the initial frame of an edit on the edit list. Similarly, when the user selects window 440, the system identifies the reference signal as the initial frame of an edit on the edit list.

In this way, in the multiple camera style editing mode the user generates an edit list in real time by sequentially selecting desired ones of windows 440 through 446

In one class of embodiments of the invention, video takes are displayed directly on monitor 35 within windows 441–446, rather than icons representing video takes elsewhere displayed. For example, this may be accomplished by connecting conventional picture-in-picture circuitry between recorders 50 and monitor 35. The picture-in-picture video displays within windows 441–446 need not have high resolution, and may be significantly compressed. Of course, when picture-in-picture video takes are displayed within windows 441–446, video monitors 52a–52d may optionally be employed (as a redundant video display means) or omitted.

With reference again to FIG. 15, in the multiple camera style editing mode, the current edit list, and related edit list information is displayed in area 473. The user may select desired setup, editing, and related functions by selecting "Setup" icon 470 or "Execute" icon 471.

In response to selection of "Setup" icon 470, the system preferably displays a pulldown menu which prompts the user to enter setup commands (such as a command specifying an audio source for one or more of video windows 440–446, or a command specifying a default transition type between each pair of edit).

In response to selection of "Execute" icon 471, the system preferably displays a pulldown menu which prompts the user to enter editing and related commands. Examples of such commands include a command for the system to commence the "sync roll" process wherein multiple source takes are simultaneously displayed (either on video monitors 52a–52d, or as picture-in-picture displays within windows 441–446), and a command specifying a default transition type between each pair of edits.

In response to user selection of icon 403 from any of the FIG. 12, 13, or 15 displays, the system executes the edit list management module software to enter the edit list management mode, and the system's user interface generates the FIG. 16 display on monitor 35.

In the edit list management mode, the current edit list, and related edit list information is displayed in area 473 of the FIG. 16 display. The user may select desired edit list management functions by selecting "Rehearse" icon 480, "List Management" icon 481, "Reformat" icon 482, or "Miscellaneous" icon 483.

In response to selection of "Rehearse" icon 480, the system executes software for playing back (on one or more of monitors 52a–52d) a show defined by an existing edit list.

Upon selection of the "List Management" icon 481, the system enables the user to highlight individual edits on the list being displayed in area 473, and to perform any of a variety of operations on the highlighted edits. For example, the user may delete the edits, copy them at the end of the list (to increase the total number of edits on the list), or modify selected parameters of the edits. As an example the latter operation, the user may highlight the first two edits on the list and then change the type of transition between them. As another example, the user may highlight the first edit on the list and then shorten its duration by entering an earlier "out" code for the first edit.

Upon selection of the "Reformat" icon 482, the system preferably displays a pulldown menu prompting the user to reformat the edit list, for example for transmission to another computer system. The pulldown menu might prompt the user to convert the edit list into ASCI format, for example, for subsequent processing by a word processor or the like.

Upon selection of the "Miscellaneous" icon 483, the system enables the user to perform such operations as printing the edit list, saving the edit list to a hard disk, or the like.

It is contemplated that the system of the invention may nclude random access memory units other than laser video disk players for storing the video and audio signals which comprise the unedited takes. For example, the takes may be digitized and stored in magnetic disk drives.

Various other modifications in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. An offline editing system, including:
    a random access storage means for storing unedited video takes; and
    a computer connected to the storage means, wherein the computer is programmed with:
    a means for controlling the storage means in response to user-entered commands; and
    a user interface for providing global access to multiple, randomly accessible video post production application software modules, including a single camera editing software module and a multiple camera editing software module, at any time during an offline editing operation.

2. The system of claim 1, wherein the application software modules also include a display edit information sfotware module, and an edit list management software module.

3. The system of claim 1, also including a computer monitor having a screen, and wherein the user interface displays an icon representing each of the application software modules on the screen.

4. The system of claim 3, also including:
    an input device for entering commands to the computer; and
    wheren the uer interface displays windows on the screen, wherein each said icon is displayed within one of the windows, and wherein the computer is programmed to access at least one of the application software modules in response to user operation of the mouse to select the window containing the icon corresponding to said at least one of the application software modules.

5. The system of claim 1, wherein the computer generates a transition icon during execution of the single camera editing software module, and in response to user selection of the transition icon, generates a sequence of pulldown menus which prompt a user to specify a splice between two edits.

6. The system of claim 5, wherein the pulldown menus include a first pulldown menu which prompts the user to select a broad transition type by selecting one of a displayed set of transition tyep icons.

7. The system of claim 6, wherein the set of transition type icons includes a cut transition icon, a dissolve transition icon, and a wipe transition icon.

8. The system of claim 6, wherein the pulldown menus also includea second pulldown menu which prompts the user to select a narrow transition type by selecting one of a displayed set of narrow transition type icons, wherein the narrow transition type icons correspond to subtypes of the selected broad transition type.

9. The system of claim 1, wherein the random access storage means includes at least one laser video disk player, and also including:
a trackball connected to the computer for entering commands to the computer;
wherein the computer generates a disk player jog/shuttle icon during execution of the single camera editing software module, and wherein, in response to user selection of the disk player jog/shuttle icon, the computer controls the laser video disk player in response to commands entered by a user using the trackball.

10. The system of claim 1, wherein the computer is programmed to display simultaneously at least two video source icons during execution of the multiple camera editing software module, wherein each of the video course icons represents a different video source take, and to generate an edit list in real time in response to sequential selection by a user of desired ones of the video source icons.

11. The system of claim 10, wherein each of the video takes comprises frames, and also including:
means for simultaneously displaying multiple video takes recorded by the random access storage means; and
wherein the computer is programmed to identify, during execution of the multiple camera editing software module, frames of the displayed video takes as initial frames of edits on the edit list in response to user selection of corresponding ones of the video source icons.

12. The system of claim 1, also including a monitor having a screen, and wherein the computer is programmed to display simultaneously in windows on the screen at least two video takes during execution of the multiple camera editing software module, and to generate an edit list in real time in response to sequential selection by a user of desired ones of the displayed video takes.

13. The system of claim 1, wherein the computer generates a setup icon during execution of the multiple camera editing software moudle, and wherein, in response to user selection of the setup icon the computer generates a pulldown menu which prompts the user to enter setup commands to the computer.

14. The system of claim 13, wherein the setup commands include a command specifying a default transition type between pairs of adjacent edits on an edit list.

15. The system of claim 1, wherein the computer generates an execute icon during execution of the multiple camera editing software module, and wherein, in response to user selection of the execution icon the computer generates a pulldown menu which prompts the user to enter editing commands.

16. The system of claim 15, wherein the editing commands include a sync roll command initiating simultaneous display of multiple video takes previously stored by the random access storage means.

17. An offline editing system, including:
a random access storage means for storing unedited video takes; and
a computer connected to the storage means, wherein the computer is programmed to include a means for controlling the storage means in response to user-entered commands, and a user interface for providing global access to multiple, randomly accessible video post production application software modules at any time during an offline editing operation, wherein the application software modules include an information display software modulea nd an edit list management software module.

18. The system of claim 17, wherein the application software modules also include a single camera editing software module and a multiple camera editing software module.

19. The system of claim 17, also including a monitor having a screen, wherein the computer displays an edit list in a first area of the screen and a highlight icon in a second area of the screen during execution of the information display software module, wherein the highlight icon includes regions corresponding to different edits on the edit list, and wherein in respone to user selection of a region of the highlight icon, the computer displays in a third area of the screen, information regarding the edit corresponding to the selected highlight icon region.

20. The system of claim 17, wherein the computer is programmed to:
generate a rehearse icon during execution of the edit list management software module; and
in response to user selection of the rehearse icon, to command the random access storage means to play back sequentially the edits comprising an edit list.

21. The system of claim 17, also including:
a video display means, connected to the random access storage means, for displaying video takes stored in the random access storage means; and
a video special effects means operating under control of the computer for generating for display on the video display means, video simulations of video transitions between selected ones of the takes.

22. The system of claim 21, wherein the computer is programmed to:
generate a rehearse icon during execution of the edit list management software module; and
in response to user selection of the rehearse icon, to command the random access storage means and the video special effects means to play back a program defined by an edit list, wherein the edit list defines transitions between each pair of adjacent edits on the edit list.

23. The system of claim 17, wherein the computer is programmed to:

generate a list management icon during execution of the edit list management software module; and to modify a displayed edit list in response to user selection of the list management icon.

24. The system of claim 23, wherein the computer is programmed, in response to user selection of the list management icon, to enable a user to highlight one or more edits on the displayed edit list and to process the highlighted edits.

25. The system of claim 17, wherein the computer is programmed to:

generate a reformat icon during execution of the edit list management software module; and to reformat a displayed edit list in response to user selection of the reformat icon.

* * * * *